United States Patent
Kuroyanagi et al.

(10) Patent No.: US 6,496,289 B1
(45) Date of Patent: Dec. 17, 2002

(54) OPTICAL EXCHANGER

(75) Inventors: Satoshi Kuroyanagi; Tetsuya Nishi; Takuji Maeda; Isao Tsuyama; Ichiro Nakajima, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/111,770

(22) Filed: Jul. 8, 1998

(30) Foreign Application Priority Data

Feb. 20, 1998 (JP) .......................................... 10-038480

(51) Int. Cl.[7] .................................................. H04J 14/02
(52) U.S. Cl. ....................................................... 359/128
(58) Field of Search .............................. 359/117, 127, 359/128, 176

(56) References Cited

U.S. PATENT DOCUMENTS

| | | | | |
|---|---|---|---|---|
| 5,457,556 A | * | 10/1995 | Shiragaki | 359/117 |
| 5,510,921 A | * | 4/1996 | Takai et al. | 359/124 |
| 5,805,320 A | * | 9/1998 | Kuroyanagi et al. | 359/117 |
| 5,878,177 A | * | 3/1999 | Karasan et al. | 385/17 |
| 5,959,767 A | * | 9/1999 | Fatehi et al. | 359/341 |
| 5,978,129 A | * | 11/1999 | Jourdan et al. | 359/326 |

FOREIGN PATENT DOCUMENTS

| | | |
|---|---|---|
| JP | 1-149893 | 6/1989 |
| JP | 3-202815 | 9/1991 |
| JP | 5-130654 | 5/1993 |
| JP | 5-130655 | 5/1993 |
| JP | 6-6844 | 1/1994 |
| JP | 6-153248 | 5/1994 |
| JP | 7-162904 | 6/1995 |
| JP | 8-298499 | 11/1996 |
| JP | 9-284814 | 10/1997 |

* cited by examiner

Primary Examiner—Leslie Pascal
Assistant Examiner—Dalzid Singh
(74) Attorney, Agent, or Firm—Staas & Halsey LLP

(57) ABSTRACT

In addition to the configuration of a conventional optical XC node, a former-stage regenerator for converting optical signals to electrical signals and regenerating optical signals again is provided at an output stage of a demultiplexer and at the input stage of an optical switch unit. Since the regenerator has a 3R function, the regenerator compensates for the influence of the noise and crosstalk generated during propagation in the transmission line, and improves the S/N ratio of the optical signals. Since the optical signals with S/N ratios improved in this way are inputted to the optical switch unit, it is sufficient only if a latter-stage regenerator compensates for the S/N ratio degradation generated in the optical switch unit, and thereby the error rate characteristic of the optical signals can be improved.

8 Claims, 17 Drawing Sheets

OPTICAL EXCHANGER

BACKGROUND OF THE INVENTION

1. Field of the Invention

The present invention relates to a configuration for preventing a waveform of an optical signal from degrading in an optical exchanger (cross-connect node).

2. Description of the Related Art

As information is being exchanged at high speed and in large volumes, a demand for networks and transmission systems with a broad band and large capacity has increased. As one means for meeting this demand the construction of an optical network is desired. An optical transmission system is a key factor in the construction of an optical network, and there is a wavelength-multiplexed optical cross-connect (XC) system as one system for such an optical transmission network. A wavelength-multiplexed optical XC refers to a photonic switching system of wavelength-multiplexed optical signals.

FIG. 1 shows the configuration of a wavelength-multiplexed optical XC and an optical network using the wavelength-multiplexed optical XC.

In the diagram the optical network comprises optical amplifiers 1500-1 through 1500-4 and optical transmission line 1501-1 through 1501-4 for connecting these optical amplifiers. A wavelength-multiplexed optical XC 1502 accommodates a plurality of optical input/output transmission line, and routes wavelength-multiplexed optical signals inputted from input optical transmission line to the desired output optical transmission line for each wavelength. The routing is controlled by an operating system 1503 provided in another network controller (not shown in the diagram). The operating system 1503 controls switching in the wavelength-multiplexed optical XC 1502, and monitors from which transmission line optical signals are inputted and to which transmission line optical signals are outputted to.

It is desirable from the viewpoint of miniaturized hardware that the configuration of the wavelength-multiplexed optical XC 1502 can be implemented without converting optical signals to electrical signals. However, as transmission distance and the number of passed nodes increase, noise generated by the optical amplifiers (spontaneous emission light) and crosstalk from other channels are accumulated, and thereby the waveforms of optical signals are degraded (that is, the error rate characteristic is degraded).

There are two systems in a wavelength-multiplexed optical XC system; that is, one is a system in which the wavelength is not converted in the node (fixed wavelength type) and the other is a system in which the wavelength is converted, if necessary (converted wavelength type).

FIGS. 2A and 2B, respectively, show the general configurations of fixed and converted wavelength type wavelength-multiplexed optical XCs using an optical switch.

The fixed wavelength type shown in FIG. 2A comprises a demultiplexer 1600, a wavelength-corresponding optical switch (optical SW) unit 1601, a multiplexer 1603 and a regenerator 1602 (consisting of an electrical/optical converter and an optical/electrical converter), and routes an input optical signal to the desired output transmission line with the wavelength unchanged by controlling the optical switch unit 1601. On the other hand, the converted wavelength type shown in FIG. 2B uses an optical switch unit 1604 with such a capacity that the same number of optical signals as the product of the number of wavelengths n multiplied by a port number k can be accommodated, and the optical switch unit 1604 is controlled so that the wavelength of an optical signal can be converted to the desired wavelength of the desired output transmission line.

FIGS. 3A and 3B, respectively, show the general configurations of fixed and converted wavelength type wavelength-multiplexed optical XCs using a wavelength filter.

The fixed wavelength type shown in FIG. 3A comprises a wavelength selector unit 1700, a demultiplexer 1701, a multiplexer 1703 and a regenerator 1702, and the wavelength selector 1700 controls using a wavelength selection filter, etc. so that optical signals of the same wavelength may not be outputted to the same output. On the other hand, the converted wavelength type shown in FIG. 3B uses a wavelength selector unit 1704 with such a capacity that the wavelength-multiplexed optical signals and the same number of optical signals as the product of the number of wavelengths n multiplied by a port number k can be accommodated for the input and output, respectively, and the wavelength selector unit 1704 is controlled so that the wavelength of an optical signal can be converted to the desired wavelength of the desired output transmission line.

As described above, the regenerators in the converted wavelength types shown in FIGS. 2B and 3B are used to convert a wavelength in addition to the regeneration function.

In the conventional configurations, although a regenerator is used, the noise and crosstalk generated in an optical XC node are combined with the noise and crosstalk generated in the transmission line. Accordingly, the error rate characteristic is degraded.

Therefore, it is necessary to prevent the noise and crosstalk generated in the optical XC node from mixing with the noise and crosstalk generated in the transmission line or to suppress the noise and crosstalk themselves in order to solve the conventional problems.

SUMMARY OF THE INVENTION

It is an object of the present invention to provide an optical XC node with a configuration for suppressing the noise and crosstalk generated in the transmission line and the noise and crosstalk generated in an optical XC node, and thereby suppressing the degradation of the error rate characteristic.

The optical exchanger of the present invention is a photonic switching apparatus for accommodating a plurality of wavelength-multiplexed optical input/output optical links, routing wavelength-multiplexed optical signals inputted from each input link, and outputting the optical signals to output links, and is characterized in comprising a demultiplexer for demultiplexing wavelength-multiplexed optical signals inputted from the input link to optical signals of each wavelength, a first regenerator for regenerating the optical signals of each wavelength outputted from the demultiplexer and compensating for the S/N ratio degradation due to propagation in the transmission line, an optical switch unit for receiving the optical signals outputted from the first regenerator, and routing and outputting the optical signals, a second regenerator for regenerating the optical signals outputted from the optical switch unit and compensating for the S/N ratio degradation generated in the optical exchanger, and a multiplexer for multiplexing the optical signals of each wavelength outputted from the second regenerator to wavelength-multiplexed optical signals and outputting the wavelength-multiplexed optical signals to the transmission line.

The optical exchanger in another aspect of the present invention is a photonic switching apparatus for accommodating a plurality of wavelength-multiplexed optical input/output optical links, routing wavelength-multiplexed optical signals inputted from each input link, and outputting the optical signals to output links, and is characterized in comprising a first demultiplexer for demultiplexing wavelength-multiplexed optical signals inputted from the input link to optical signals of each wavelength, a first regenerator for regenerating the optical signals of each wavelength outputted from the demultiplexer and compensating for the S/N ratio degradation due to propagation in the transmission line, a first multiplexer for multiplexing the optical signals of each wavelength outputted from the first regenerator, a wavelength selector unit, consisting of two optical couplers and one multi-wavelength selection filter for routing the wavelength-multiplexed optical signals from the first multiplexer, a second demultiplexer for demultiplexing the optical signals outputted from the wavelength selector unit to optical signals of each wavelength, a second regenerator for regenerating the optical signals of each wavelength from outputted from the second demultiplexer and compensating for the S/N ratio degradation generated in an optical exchanger, and a second multiplexer for multiplexing the optical signals outputted from the second regenerator and outputting the wavelength-multiplexed optical signals to the transmission line.

The optical exchanger in another aspect of the present invention is a photonic switching apparatus for accommodating a plurality of wavelength-multiplexed optical input/output optical links, routing wavelength-multiplexed optical signals inputted from each input link, and outputting the optical signals to output links, and is characterized in comprising a demultiplexer for demultiplexing wavelength-multiplexed optical signals inputted from the input link to optical signals. of each wavelength, a first regenerator for regenerating the optical signals of each wavelength outputted from the demultiplexer and compensating for the S/N ratio degradation due to propagation in the transmission line, a first multiplexer for multiplexing the optical signals of each wavelength outputted from the first regenerator, a wavelength selector unit, consisting of two optical couplers and one wavelength selection filter for routing the wavelength-multiplexed optical signals inputted from the first multiplexer, a second regenerator for regenerating optical signals from the optical signals of each wavelength outputted from the wavelength selector unit and compensating for the S/N ratio degradation generated in an optical XC node, and a second multiplexer for multiplexing the optical signals of each wavelength outputted from the second regenerator and transmitting then to the transmission line.

According to the present invention, by providing a regenerator for optical signals on the input side of an optical exchanger and eliminating noise and crosstalk degrading the S/N ratio of optical signals prior to routing, only the compensation for the S/N ratio degradation due to the noise generated by optical amplifiers provided in the optical exchanger and the crosstalk due to routing, is needed in a regenerating means provided on the output side of the optical exchanger. That is, since the regeneration means on the input side of the optical exchanger compensates for the S/N ratio degradation due to the transmission line beforehand, and the error rate characteristic in the case where optical signals are regenerated on the output side is improved. Accordingly, the error rate characteristic of the entire optical exchanger is also improved.

DESCRIPTION OF THE PREFERRED EMBODIMENTS

Figure 4:
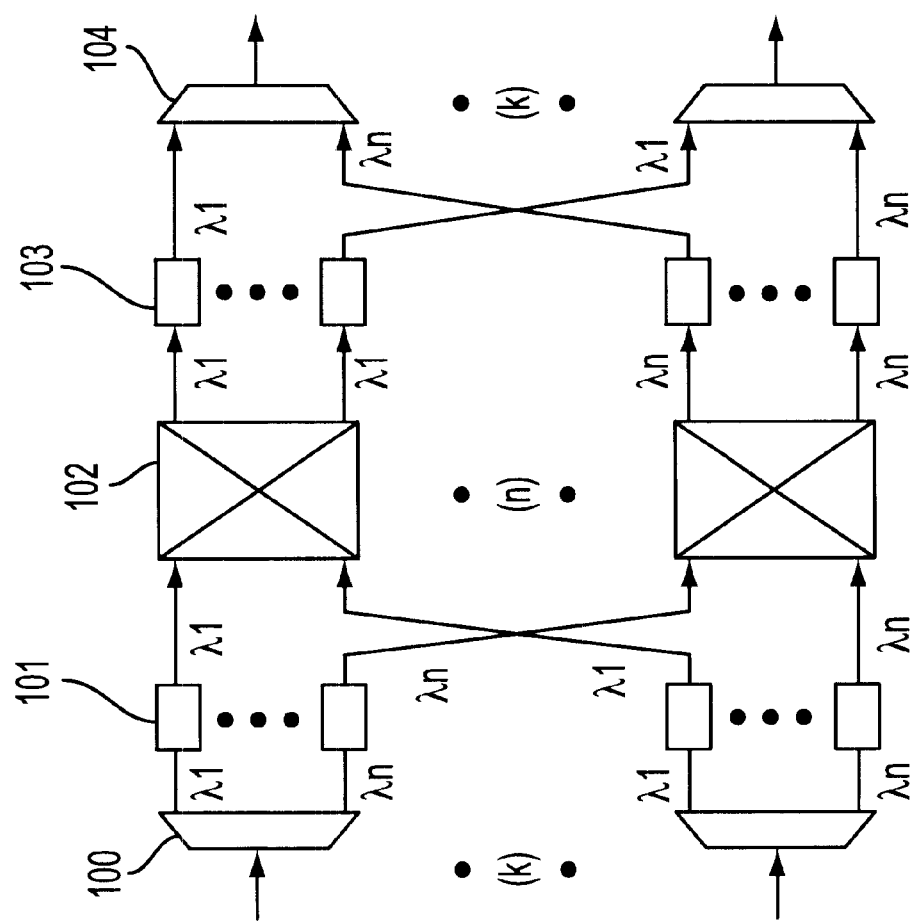
FIG. 4 shows a configuration of the fixed wavelength type wavelength-multiplexed optical XC using optical switches of the present invention.

FIG. 4 shows a configuration of the fixed wavelength type wavelength-multiplexed optical XC using optical switches of the present invention.

Figure 1:
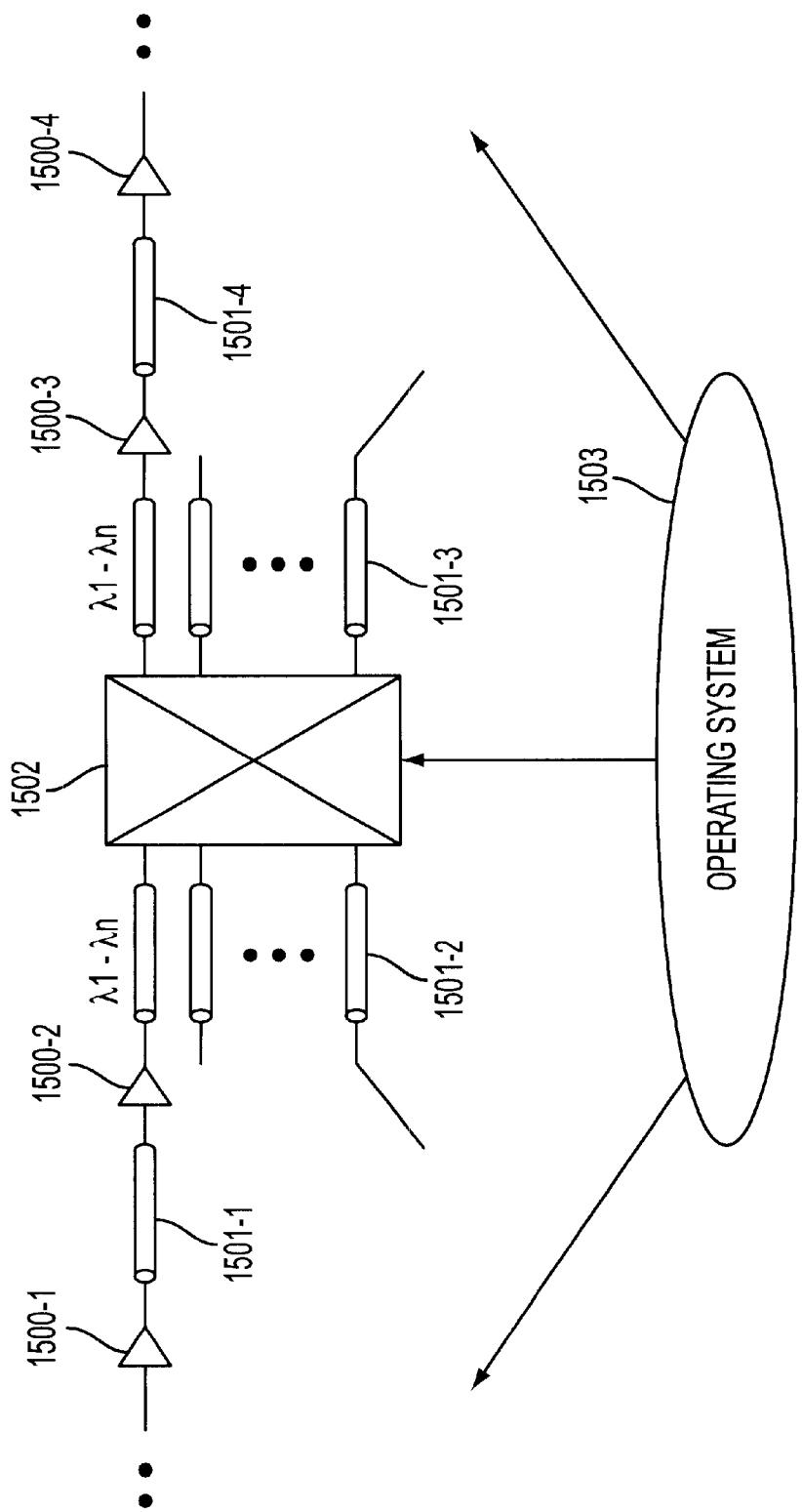
FIG. 1 shows the configuration of a wavelength-multiplexed optical XC and an optical network using the wavelength-multiplexed optical XC.
Figure 2B:
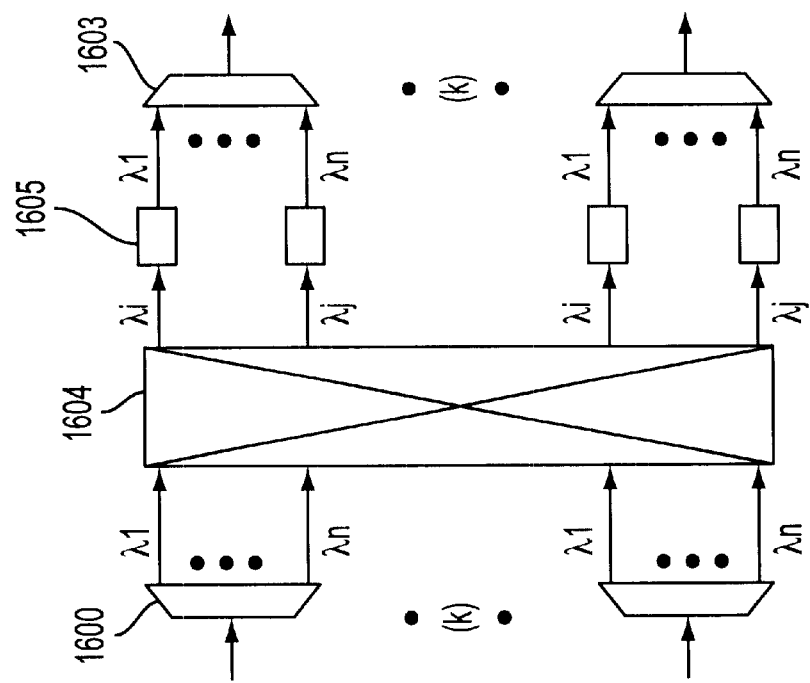
FIGS. 2A and 2B, respectively, show the general configurations of fixed and converted wavelength type wavelength-multiplexed optical XCs using an optical switch.
Figure 2A:
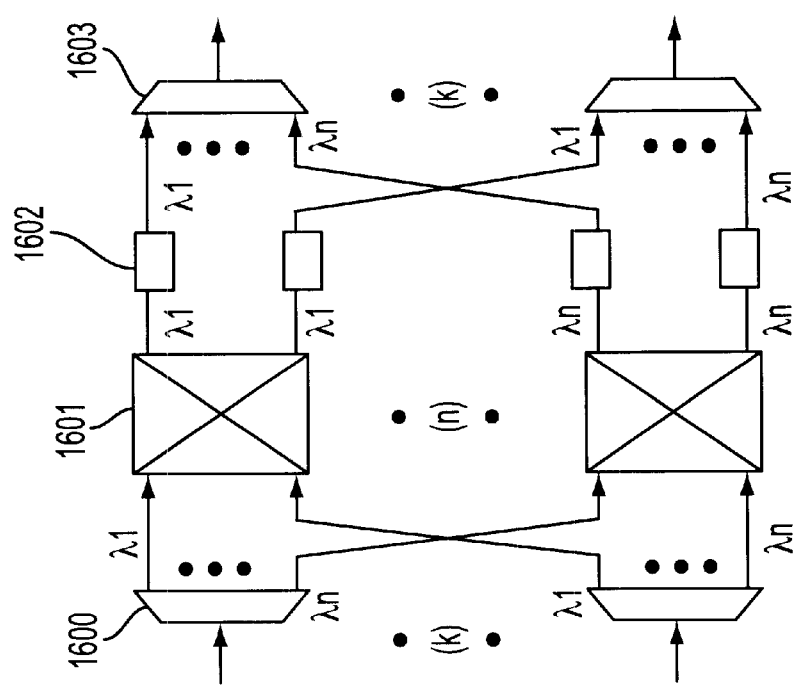
Figure 3B:
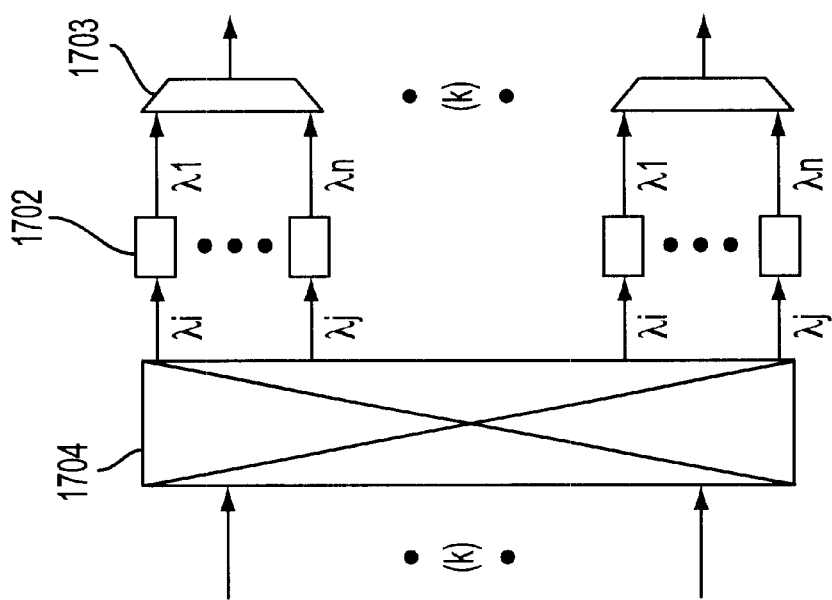
FIGS. 3A and 3B, respectively, show the general configurations of fixed and converted wavelength type wavelength-multiplexed optical XCs using a wavelength filter.
Figure 3A:
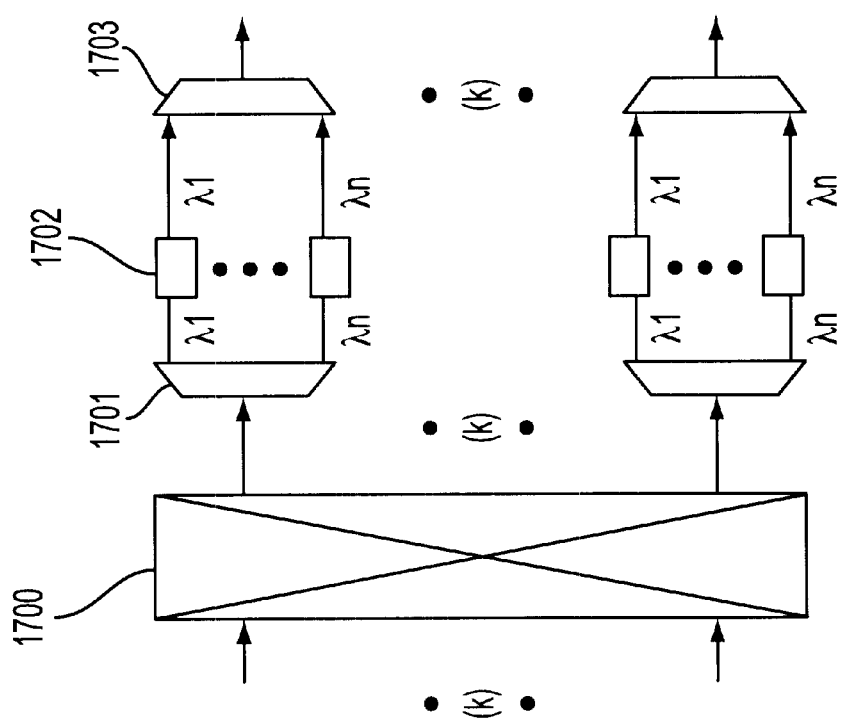

FIG. 4 shows a configuration in which a regenerator 101 is also provided on the output of a demultiplexer 100 in a conventional configuration (FIG. 2A). In the regenerator 101 the wavelengths of output optical signals remain the same as the wavelengths of input optical signals. The former-stage regenerator 101 of this configuration can regenerate optical signals by compensating for the degradation due to the noise and crosstalk generated in the transmission line only. The latter stage regenerator 103 can regenerate optical signals by compensating for the degradation of the noise and crosstalk generated in the wavelength-multiplexed optical XC only.

The regenerators 101 and 103 comprise an optical receiver (OR) and an optical sender (OS), convert the electrical signals to optical signals again after converting optical signals to electrical signals, and transmit the optical signals. In this case, when optical signals are converted to electrical signals, in the optical receiver a so-called 3R function is used to reshape the signal waveforms. Therefore, when optical signals with degraded waveforms transmitted from the transmission line are received and converted to electrical signals by the optical receiver, the waveforms are reshaped and outputted. That is, the waveforms degraded by noise, etc. are compensated for and the signals are outputted as electrical signals. Since a transmitter is driven by these electrical signals with reshaped waveforms, optical signals outputted from the regenerators 101 and 103 are outputted with the noise and crosstalk suppressed, that is, with the S/N ratio improved.

In the drawing a wavelength-multiplexed optical signal is inputted to a demultiplexer 100, and is demultiplexed to optical signals of each wavelength ($\lambda 1$ to $\lambda n$). The optical signals of each wavelength are inputted to corresponding regenerators 101 provided for each wavelength. The optical signals of each wavelength outputted from the regenerators 101 are outputted after the S/N ratio degraded by the noise and crosstalk generated in the transmission line are improved. The optical signals of each wavelength ($\lambda 1$ to $\lambda n$) outputted from these regenerators 101 are inputted to corresponding optical switch units 102 provided for each wavelength, and routed. The optical signals routed and outputted are inputted to corresponding regenerators 103 provided for each signal.

In the regenerator 103 the optical signals are outputted with the waveform degraded by the noise and crosstalk generated in the optical switch unit 102 compensated for as described above. Thus, the optical signals with improved S/N ratios are outputted from the regenerators 103, and are inputted to multiplexers 104. The multiplexers 104 are configured so that optical signals of different wavelengths may be inputted, the received optical signals different in wavelengths from each other are wavelength-multiplexed, and the optical signals are outputted to the transmission line.

In this way, by providing a regenerator 101 before the optical switch unit 102, optical signals are inputted to the optical switch unit 102 after the S/N ratio degradation generated in the transmission line is compensated for, and the S/N ratio degradation generated by the optical switch unit 102 is compensated for by the regenerator 103. In this manner, since it is sufficient if the regenerator 103 compensates for the S/N ratio degradation generated in the optical switch unit 102 only, optical signals can be prevented from being degraded so badly that the optical signals may not be regenerated because of the degraded S/N ratio. On the other hand, conventionally, since a regenerator 101 is not provided, not only the S/N ratio degradation generated in the optical switch unit 102 but also the S/N ratio degradation generated in the transmission line had to be compensated for by the latter-stage regenerator 103, and the optical signals are only regenerated by the latter-stage regenerator 103.

Thus, since the optical signals are regenerated after the waveform degradation of the optical signals becomes great, there is a possibility that the error rate of the signals become great. However, according to the present invention, the error rate can be suppressed to be low.

Figure 5B:
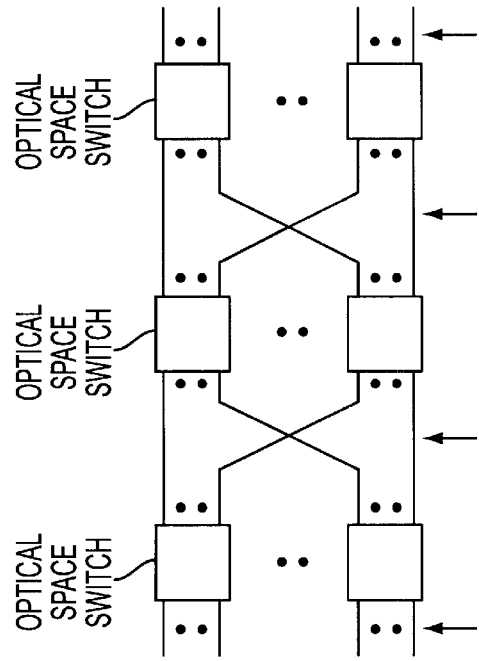
FIGS. 5A through 5C show one-stage and three-stage configurations using optical space switches as a general configuration of an optical switch unit.
Figure 5C:
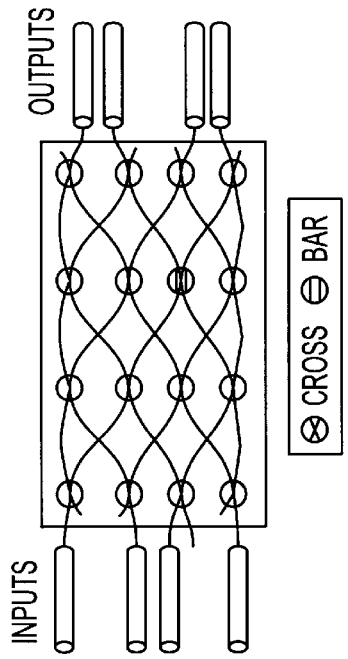
Figure 5A:
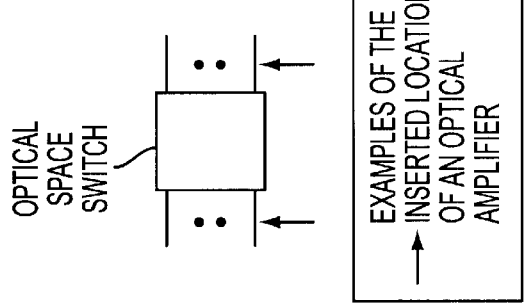

FIGS. 5A through 5C show one-stage and three-stage configurations using optical space switches as a general configuration of an optical switch unit.

FIG. 5A and FIG. 5B show the cases where optical space switches are configured in one stage and where optical space switches are configured in three stages, respectively. Although in this way an optical switch unit can be configured using optical space switches, it is necessary to provide the optical space switches in multi-stages according to the numbers of lines and channels (wavelengths) accommodated by the optical switch unit. Since particularly an 8×8 optical space switch with eight inputs and eight outputs is currently popular, it is necessary to provide optical space switches in multi-stages when an optical switch unit is actually introduced into an optical network. On the other hand, in an optical space switch the loss of an optical signal increases proportional to the numbers of accommodated lines and channels. For this reason, it is necessary to insert optical amplifiers before and after the optical space switch. In FIGS. 5A and 5B the inserted locations of an optical amplifier are marked by arrows.

FIG. 5C shows a configuration of a 4×4 optical space switch. The 4×4 optical space switch shown in FIG. 5C is configured so that optical waveguides are crossed at many points on the substrate. A configuration for modifying the path of an optical signal is provided at a point where these waveguides are crossed, the path of the optical signal is determined by applying a control signal from a controller circuit (not shown in the diagram). The path of an optical signal inputted from the left of FIG. 5C is determined at the crossing of waveguides, and the optical signal is properly routed and outputted to the output side on the right of FIG. 5C.

The details of an optical space switch like this are, for example, described in the Japanese Laid-open Patent Publication No. 6-66982.

Figure 6:
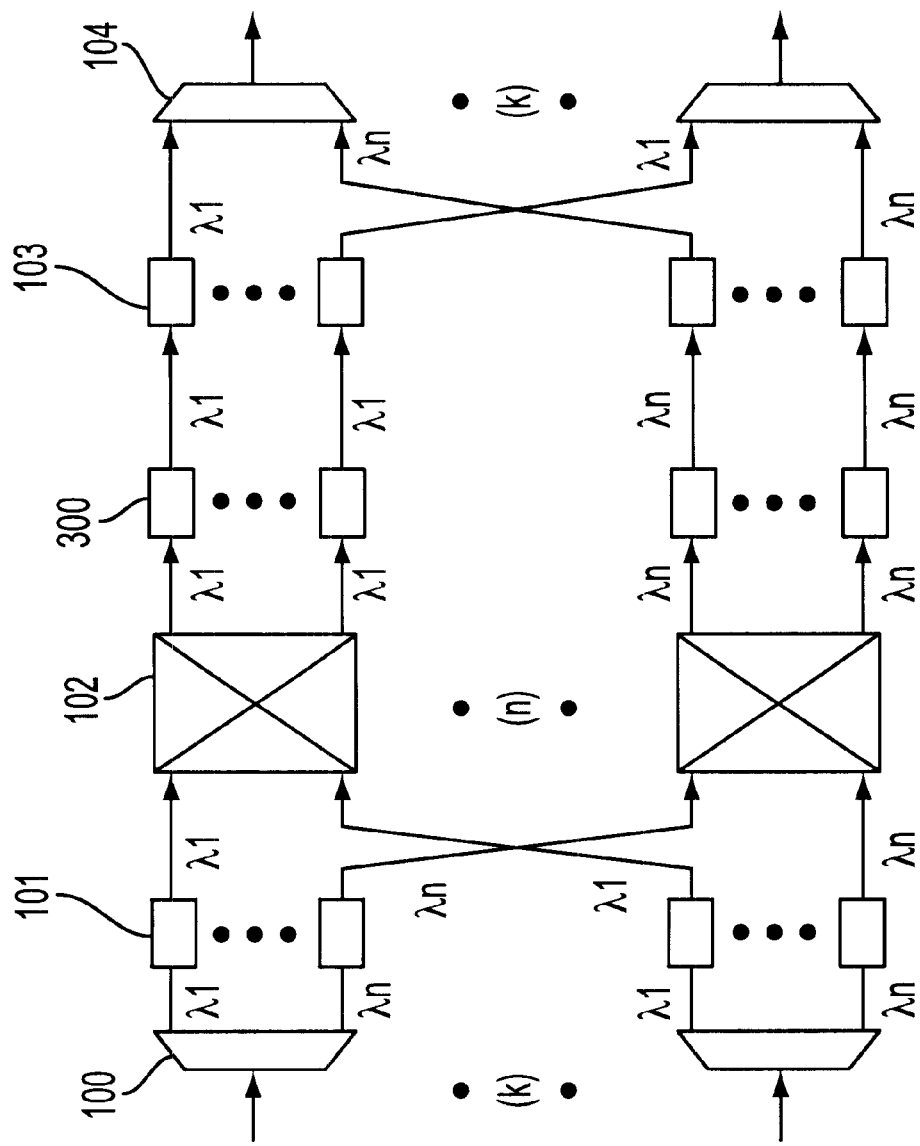
FIG. 6 shows a configuration in which a noise elimination filter is provided before the latter-stage regenerator shown in the configuration shown in FIG. 4.

FIG. 6 show a configuration in which a noise elimination filter is provided before the latter stage regenerator shown in the configuration shown in FIG. 4.

In FIG. 6 the same components as in FIG. 4 are given the same reference numbers as in FIG. 4.

The object of a noise elimination filter 300 is to eliminate noise generated in an optical switch unit 102 when an optical amplifier is provided in the optical switch unit 102. However, some noise in the neighborhood of the wavelength of an optical signal remains. But, the error rate characteristic in the latter-stage regenerator 103 can be improved.

When wavelength-multiplexed optical signals are inputted to a demultiplexer 100, the optical signals are demultiplexed to optical signals of each wavelength by the demultiplexer 100. The optical signals of each wavelength are regenerated by regenerators 101 provided for each wavelength, and are inputted to corresponding optical switch units 102 provided for each wavelength. In this case, the optical signals of which the S/N ratio degradation due to the noise and crosstalk generated in the transmission line are partly compensated for are inputted to the optical switch unit 102.

The optical signals of each wavelength are routed by the optical switch unit 102, and are outputted to each port. The optical switch units 102 at the top and at the bottom of FIG.

6 are for optical signals of wavelengths λ1 and λn, respectively. The optical switch units for optical signals of wavelengths λ2 to λn-1 are also provided, although these optical switch units are not shown in the diagram.

When the optical signals are outputted from each optical switch unit, the optical signals are inputted to noise elimination filters 300 provided for each port. The noise elimination filters 300 are configured so as to pass the wavelength of the main signal of the optical signals, and eliminate other noise and crosstalk generated in the wavelengths. Thus, the noise generated in the optical switch unit 102, and particularly, almost all the noise generated by the optical amplifier provided in the optical switch unit 102 is eliminated. Accordingly, the S/N ratio of each optical signal is improved, and the noise is eliminated.

Then, after the optical signals pass through the noise elimination filter 300, the optical signals are inputted to the corresponding regenerator 103 provided for each port. Since the S/N ratio of the optical signal inputted to the regenerator 103 is improved by the noise elimination filter 300, the regenerator 103 can regenerate an optical signal with an improved S/N ratio. Thus, the S/N ratio of the optical signals is further improved by regenerating the optical signals. Particularly, the noise and crosstalk with almost the same wavelength as the main signal of the optical signal which cannot be eliminated by the noise elimination filter 300, can be suppressed by regenerating. Accordingly, both the noise and crosstalk of the optical signals inputted to the multiplexer 104 at the next stage which are present when the optical signals are inputted to the wavelength-multiplexed optical XC in the diagram, and the noise and crosstalk generated in the optical switch unit 102, are significantly suppressed.

The multiplexer 104 receives optical signals different in wavelength with each other out of optical signals outputted from the optical switch unit 102, wavelength-multiplexes the optical signals, and transmits the optical signals to the transmission line. In this way, wavelength-multiplexed optical signals with improved S/N ratios can be outputted to the transmission line by providing a regenerator 101 on the input side of the wavelength-multiplexed optical XC and providing a noise elimination filter 300.

Figure 7:
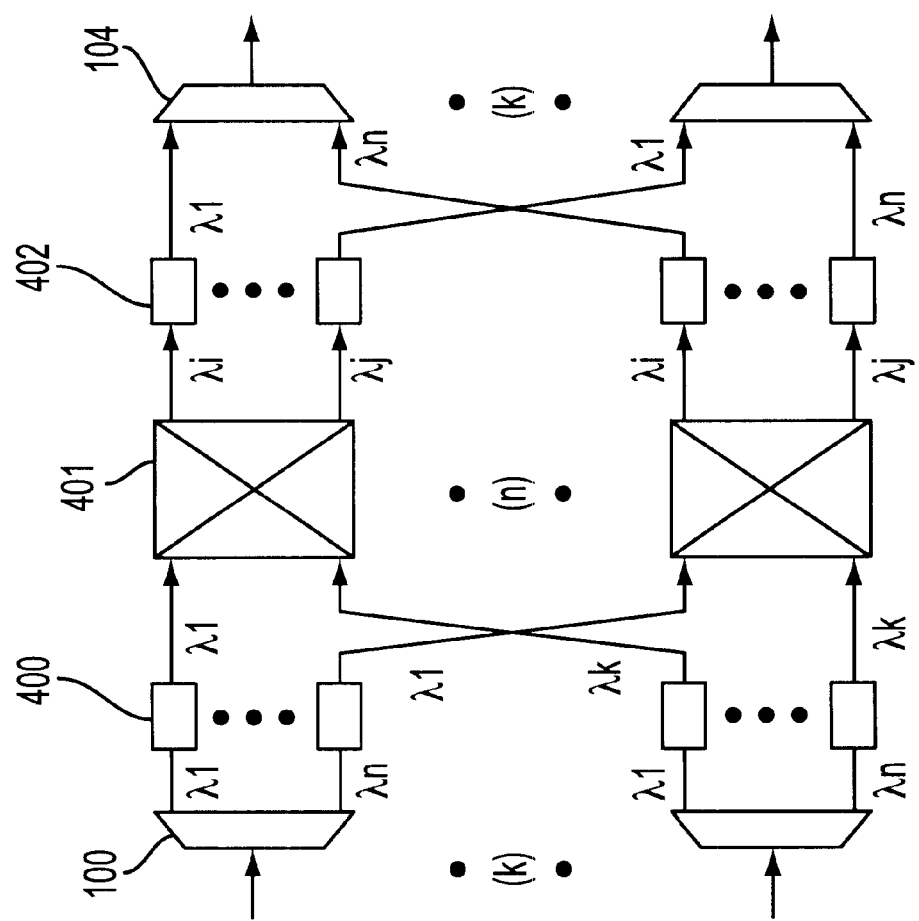
FIG. 7 shows a configuration in which the output wavelength of the former-stage regenerator is set in the configuration shown in FIG. 4 so that all the input wavelengths to a certain optical switch unit may be different from each other.

FIG. 7 shows a configuration in which the output wavelength of the former-stage regenerator is set in the configuration shown in FIG. 4 so that all the input wavelengths to a certain optical switch unit may be different from each other.

In FIG. 7 the same components as in FIG. 4 are given the same reference numbers as in FIG. 4.

By differentiating all the wavelengths of optical signals inputted to one optical switch unit 401 in the same way as shown in FIG. 7, coherent crosstalk (the wavelength of a crosstalk light beam being the same as the wavelength of a signal light beam) generated in the optical switch unit 401 can be eliminated. Thus, the error rate characteristic in the latter-stage regenerator 402 can be improved.

As described earlier, although an optical switch unit is configured using optical space switches as shown in FIG. 5C, there is a possibility that the crosstalk of optical signals is generated, since optical waveguides cross at many points. Particularly, since the characteristics of the optical signals are similar, crosstalk is easily generated where the optical waveguides cross in an optical space switch. For this reason, by differentiating the wavelengths of optical signals inputted to an optical space switch, crosstalk can be reduced.

When wavelength-multiplexed optical signals are inputted to a demultiplexer 100, the optical signals are demultiplexed to optical signals of each wavelength λ1 to λn. A former-stage regenerator 400 regenerates the optical signals of each wavelength and improves the S/N ratio, and changes the wavelengths and differentiates the wavelengths of the optical signals.

In the configuration shown in FIG. 7 each optical signal is sequentially led from a demultiplexer 100 at the top of FIG. 7 to a different optical switch unit 401. That is, an optical signal is inputted from a plurality of different demultiplexers 100 to each optical switch unit 401. Therefore, if all the optical signals from one demultiplexer 100 have the same wavelength, and different demultiplexers 100 process optical signals of different wavelengths, all the optical signals inputted to one optical switch unit 401 have different wavelengths. Accordingly, in FIG. 7, a regenerator 400 corresponding to the demultiplexer 100 at the top of FIG. 7 is designed to convert the wavelengths of all the received optical signals to λ1. In the same way, a regenerator 400 corresponding to the demultiplexer 100 at the bottom of FIG. 7 is designed to convert the wavelengths of all the received optical signals to λk. In the same way, the other regenerators 400 corresponding to the other demultiplexers 100 located between are designed to convert the wavelengths of all the received optical signals to wavelengths different from each other, although this is not shown in the diagram.

In this way, when optical signals are inputted to the optical switch unit 401, the optical signals are routed and outputted. The output optical signals are inputted to a regenerator 402, and are wavelength-converted again. In this case, each optical signal is wavelength-converted so as to be convenient to be transmitted to the transmission line. That is, a regenerator 402 corresponding to an optical switch unit 401 at the top of FIG. 7 inputs each of the received optical signals to different multiplexers. In the same way, each of the other optical signals from another regenerator 402 corresponding to another optical switch unit 401 is inputted to a different multiplexer 104. It is necessary for all the wavelengths of input optical signals to be different from each other in order to be wavelength-multiplexed by the multiplexer 104. For this purpose, it is sufficient only if a regenerator 402 corresponding to each optical switch unit 401 converts all the received optical signals to optical signals of the same wavelength.

In this way, in the diagram a regenerator 402 corresponding to an optical switch unit 401 at the top of FIG. 7 is designed to convert the wavelengths of all the received optical signals to λ1. In the same way, a regenerator 402 corresponding to an optical switch unit 401 at the bottom of FIG. 7 is designed to convert the wavelengths of all the received optical signals to λn. In the same way, the other regenerators 402 corresponding to the other demultiplexers 100 located between are designed to convert the wavelengths of all the received optical signals to wavelengths different with each other, although this is not shown in the diagram.

In this way, optical signals different from each other inputted to the multiplexer 104 are wavelength-multiplexed and outputted to the transmission line.

According to the configuration shown in FIG. 7, since received optical signals inputted to one optical switch unit 401 all have different wavelengths, no coherent crosstalk is generated in the optical switch unit 401, and the S/N ratio of the optical signals transmitted from the wavelength-multiplexed optical XC in the diagram can be favorably maintained. Particularly, when coherent crosstalk is generated, it is difficult to eliminate the crosstalk and to extract only a main signal, since the wavelengths of the main signal and crosstalk are the same. However, the configuration has an advantage that the main signal can be quite easily extracted when the wavelengths of the main signal and crosstalk are different.

Figure 8:
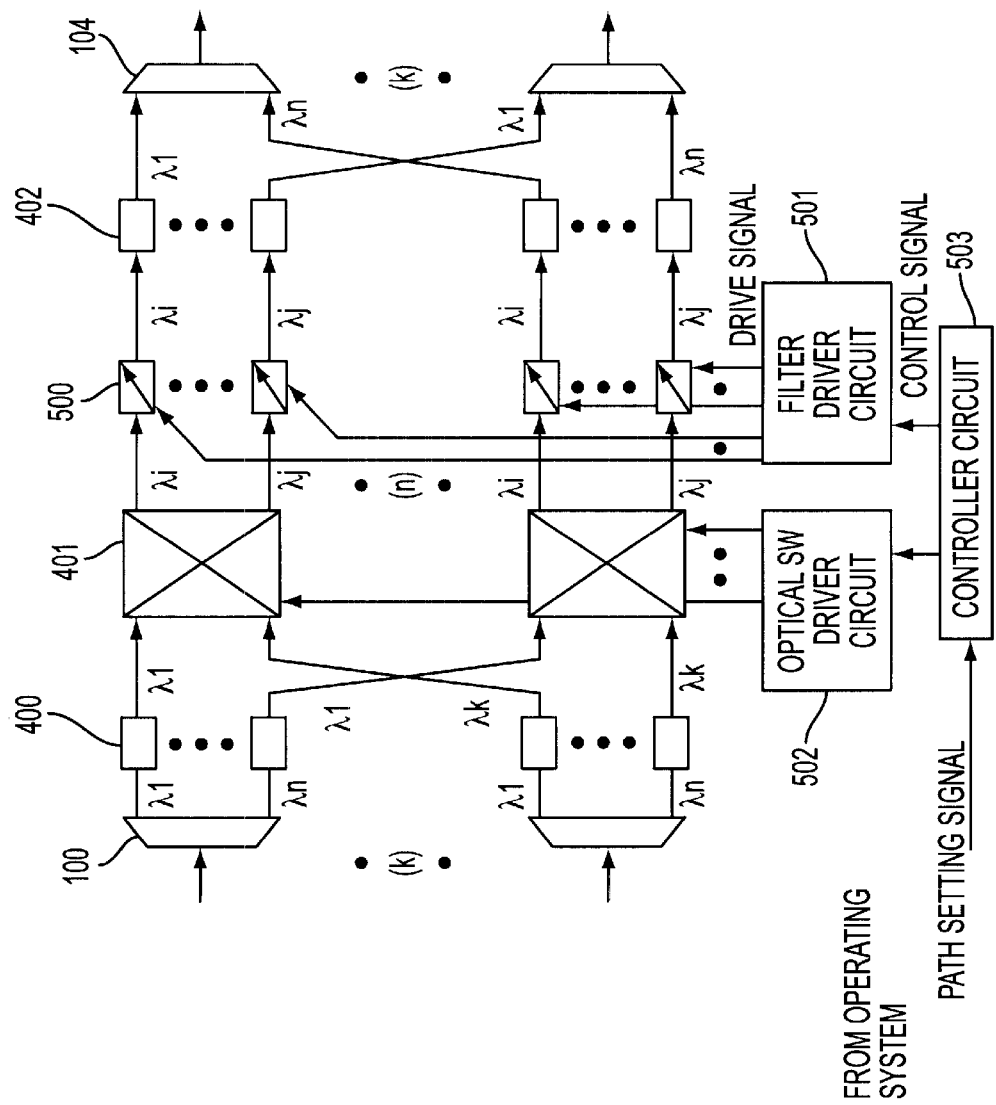
FIG. 8 shows a configuration in which a noise elimination filter capable of changing transmission wavelength is provided before the latter stage regenerator in the configuration shown in FIG. 7.

FIG. 8 shows the configuration in which a noise elimination filter capable of changing a transmission wavelength is provided before the latter-stage regenerator in the configuration shown in FIG. 7.

In FIG. 8 the same components as in FIG. 7 are given the same reference numbers as in FIG. 7.

In FIG. 8 the wavelength of the former-stage regenerator 400 is set in the same way as in FIG. 7 so that all the input optical signals may differ in wavelength. Thus, the error rate characteristic in the latter-stage regenerator 402 can be improved. In addition to this, since a noise elimination filter 500 is provided, the error rate characteristic of the latter-stage regenerator 402 can be further improved.

When the wavelength-multiplexed optical signals are inputted to a demultiplexer 100, the optical signals are demultiplexed to optical signals of each wavelength by the demultiplexer 100. The optical signals are regenerated by the regenerator 400, the S/N ratios are improved, and the wavelengths are converted to wavelengths corresponding to each of the demultiplexers 100, as described with reference to FIG. 7. The optical signals of different wavelengths from the regenerators 400 are inputted to one optical switch unit 401. After each optical signal is routed, the optical signal is outputted from the optical switch 401, and is inputted to a noise elimination filter 500. The noise elimination filter 500 is designed so as to pass only a main signal, and thereby the noise and crosstalk are eliminated.

After the optical signals pass through the noise elimination filter 500, the optical signals are inputted to a regenerator 402 and regenerated, and as described with reference to FIG. 7, are wavelength-multiplexed and inputted to each multiplexer 104. Optical signals of different wavelengths are inputted to each multiplexer 104, and the optical signals are wavelength-multiplexed and outputted to the transmission line.

Since optical signals inputted to one optical switch unit 401 have different wavelengths, it is unknown of which wavelength an optical signal is outputted from which port, which depends on the routing status. Therefore, unlike a filter with a fixed transmission band, the transmission band of the noise elimination filter 500 has to be able to be changed according to the wavelength of an input optical signal. For this reason, a controller circuit 503 for managing and controlling the routing of the optical switch unit 401 is also designed so as to control the transmission bands of the noise elimination filters 500.

The controller circuit 503 receives a path setting signal being routing information from the operation system of an optical network. The controller circuit 503 controls an optical switch driver circuit 502 based on this signal, and establishes a path for each optical switch unit 401. Although in the above-mentioned configuration the controller circuit (not shown in FIG. 8 of the above-mentioned configuration) only controls the optical switch unit, in this configuration the controller circuit also judges from the path setting signal which wavelength optical signal should be outputted from which port of the optical switch unit 401. Based on the result of this judgement the controller circuit 503 provides a filter driver circuit 501 with a control signal, and properly sets the transmission band of each noise elimination filter 500.

For a filter with a variable transmission band, an acousto-optical filter, fiber Fabry-Perot filter, etc. can be used.

Figure 9:
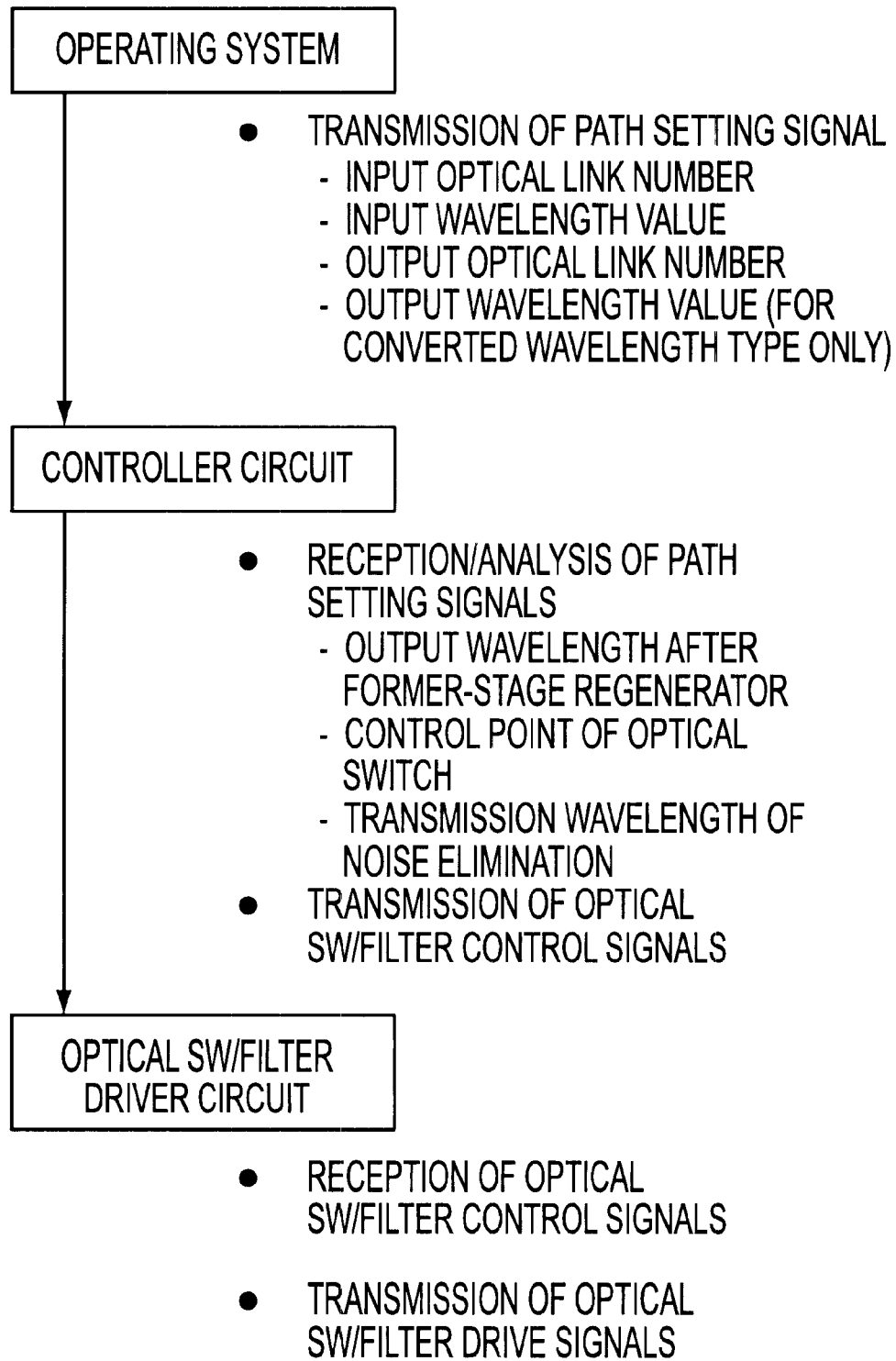
FIG. 9 is a flowchart showing the control process of the noise elimination filter in the configuration shown in FIG. 8.

FIG. 9 is a flowchart showing the control process of the noise elimination filter in the configuration of FIG. 8.

The operation system inputs a path setting signal to the controller circuit when routing optical signals using a wavelength-multiplexed optical XC. This path setting signal comprises an input optical link number, an input wavelength value, an output optical link number, an output wavelength value (used only in the case of converted wavelength type wavelength-multiplexed optical XC described below), etc.

When the controller circuit receives a path setting signal, the controller circuit analyzes this signal, and calculates the output wavelengths of optical signals immediately after the former-stage regenerator, the control point of an optical switch unit and the transmission wavelength of a noise elimination filter. Based on these values, the controller circuit outputs control signals for the optical space switch and the noise elimination filter to the driver circuit.

When the optical switch and the filter driver circuit receive the control signals for the optical space switch and the noise elimination filter, respectively, the optical switch and the filter driver circuit respectively convert these signals to drive signals for the optical space switch and the noise elimination filter, and output the drive signals for the optical space switch and the noise elimination filter to the optical space switch and noise elimination filter, respectively.

Since the more concrete contents of the analysis method of the path setting signal of the above-mentioned controller circuit would be properly and optimally designed by a person having ordinary skill in the art, the analysis method is not described in detail here. However, the analysis method will be easily implemented by the person having ordinary skill in the art.

The above-mentioned configurations are all for a fixed wavelength type wavelength-multiplexed optical XC, in that optical signals of a specific wavelength immediately after the demultiplexer 100 are inputted to the optical switch unit corresponding to the wavelength, and are wavelength-multiplexed with the wavelengths as they are or are converted to the same wavelengths again immediately before the multiplexer 104.

Configurations for a converted wavelength type wavelength-multiplexed optical XC for routing optical signals after converting the original wavelengths of optical signals and outputting the optical signals with wavelengths different from the original are described below.

Figure 10:
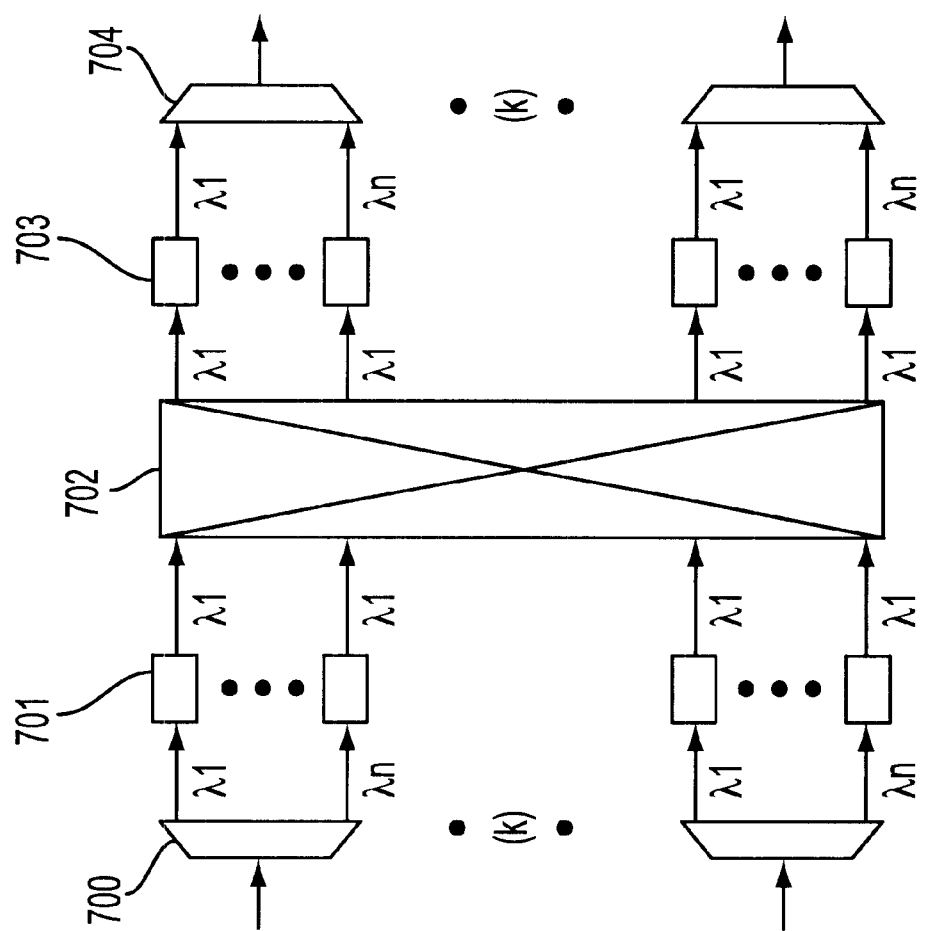
FIG. 10 shows a configuration of the converted wavelength type wavelength-multiplexed optical XC using optical switches.

FIG. 10 shows a configuration of the converted wavelength type wavelength-multiplexed optical XC using optical switches.

FIG. 10 shows a configuration in which a regenerator is provided on the output side of a demultiplexer in a conventional configuration (FIG. 2B), and all the wavelengths of the regenerated optical signals are the same ($\lambda 1$ in FIG. 10). In this configuration, in the former-stage regenerator, optical signals can be regenerated by compensating for only the degradation due to the noise and crosstalk generated in the transmission line. In the latter-stage regenerator, optical signals can be regenerated by compensating for only the noise and crosstalk generated in the optical XC.

When wavelength-multiplexed optical signals are inputted to a demultiplexer 700, the optical signals are demultiplexed to optical signals of each wavelength, and are inputted to a regenerator 701 provided for each optical signal of each wavelength. After the optical signals are regenerated by the regenerator 701 and the S/N ratio degradation due to the transmission line is compensated for, the wavelength of the optical signals are converted. In the diagram all the wavelengths of optical signals outputted from the regenerator 701 are λ1. These optical signals are inputted to an optical switch unit 702 and are routed. In the diagram, unlike the fixed wavelength type described earlier, the optical switch unit 702 is configured so as to route all the received optical signals equally. In this configuration, since the wavelengths of any optical signals immediately after the demultiplexer 700 are routed equally, all the optical signals do not necessarily have the same wavelengths as when first inputted, when the optical signals are outputted from a multiplexer 704. That is, the optical signals are routed with the wavelengths converted.

The optical signals routed in the optical switch unit 702 are regenerated by a regenerator 703 provided for each output port of the optical switch unit 702, and the S/N ratio degradation generated in the optical switch unit 702 is compensated for. Furthermore, in the regenerator 703, the wavelengths of the optical signals inputted to one multiplexer 704 are converted to be different from each other so as to be wavelength-multiplexed by the multiplexer 704. Then, the optical signals are wavelength-multiplexed by the multiplexer 704, and are outputted to the transmission line.

Even in the configuration shown in FIG. 10, in the same way as in FIG. 4, if a regenerator 701 is provided on the input side of the optical switch unit so as to compensate for the degradation of the S/N generated in the transmission line, it is sufficient if the latter-stage regenerator 703 compensate for only the S/N ratio degradation generated in the optical switch unit 702, and thereby the error rate characteristic of the optical signals can be improved.

Figure 11:
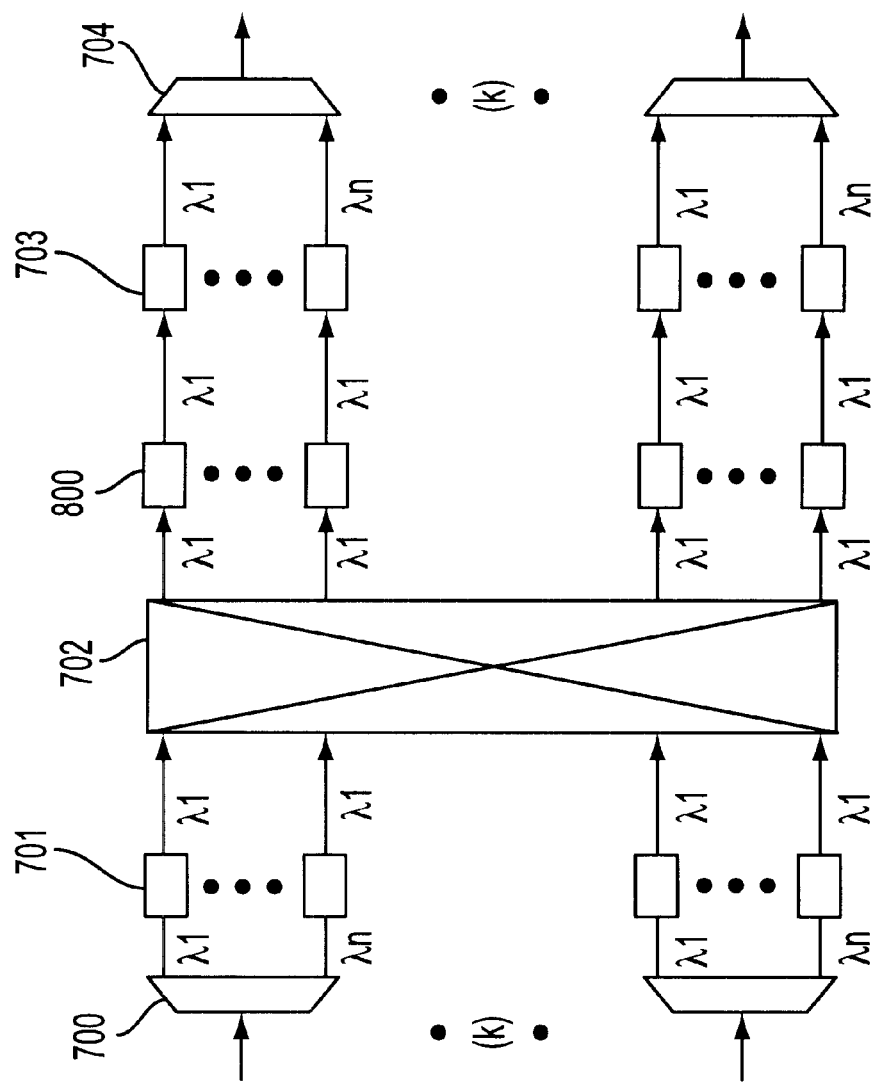
FIG. 11 shows a configuration in which a noise elimination filter is provided before the latter-stage regenerator in the configuration shown in FIG. 10.

FIG. 11 shows the configuration in which a noise elimination filter is provided before the latter-stage regenerator in the configuration shown in FIG. 10.

In FIG. 11 the same components as in FIG. 10 are given the same reference numbers as in FIG. 10.

The object of a noise elimination filter 800 is to eliminate noise generated in the optical switch unit 702 when an optical amplifier is provided in the optical switch unit 702. (However, some noise remains in the neighborhood of a wavelength of an optical signal.) Thus, the error rate characteristic of the latter-stage regenerator can be improved.

When wavelength-multiplexed optical signals are inputted to a demultiplexer 700, the optical signals are demultiplexed to optical signals of each wavelength, and are regenerated by a regenerator 701. That is, the influence of the loss and crosstalk generated in the transmission line is removed. Furthermore, as described with reference to FIG. 10, the wavelength of all the optical signals are converted to the same wavelength (λ1 in the diagram). These optical signals are inputted to an optical switch unit 702, are routed, and are outputted. The outputted optical signals are outputted with the noise and crosstalk generated in the optical switch unit 702 eliminated by the noise elimination filter 800. In the diagram, since the wavelength of the main signal of the optical signals outputted from the optical switch unit 702 is determined to be λ1, the transmission band of the noise elimination filter can be fixed. The optical signals passed through the noise elimination filter 800 are inputted to a regenerator 703, are regenerated there, and the wavelengths of the optical signals are converted. The S/N ratio of the optical signals and the error rate characteristics are further improved by the regeneration in the regenerator 703. The wavelength conversion by the regenerator 703 is performed so that all the optical signals inputted to one multiplexer 704 differ in wavelength. In the diagram the converted wavelengths are λ1 to λn.

In this way, optical signals of wavelengths of λ1 to λn are wavelength-multiplexed by the multiplexer 704, and are outputted to the transmission line.

As described with reference to FIG. 10, since each optical signal outputted from a plurality of demultiplexers 700 are equally routed, the wavelength is not necessarily the original wavelength when the optical signal is outputted from the regenerator 703.

Figure 12:
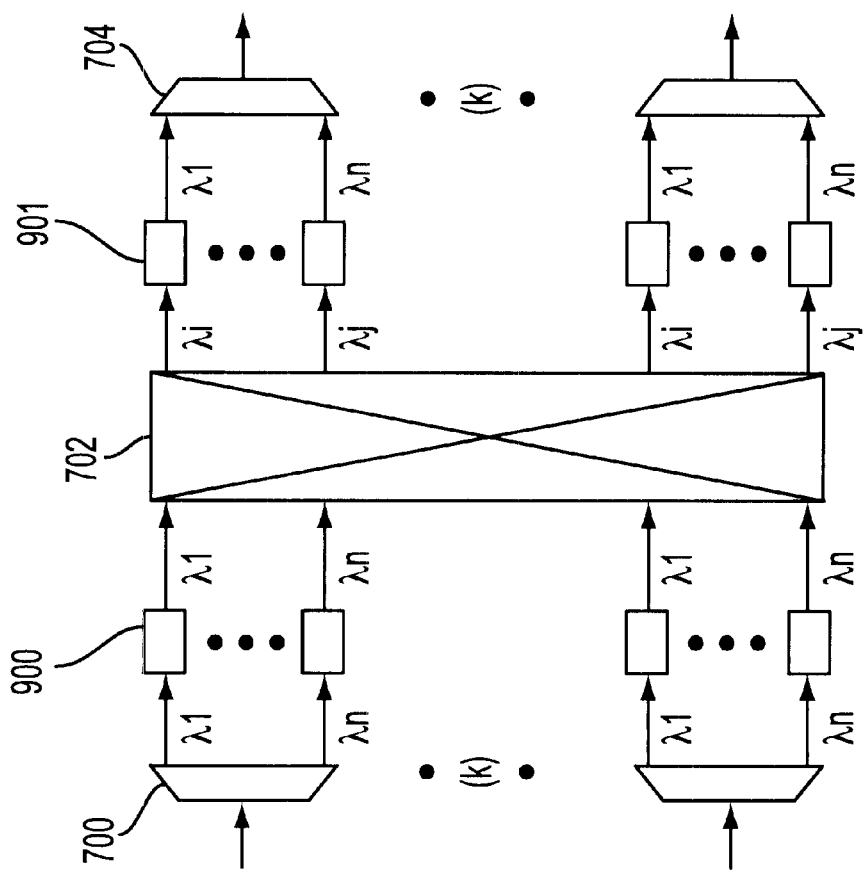
FIG. 12 shows a configuration in which the wavelength of output optical signals from the former-stage regenerator are the same as the wavelength of the input optical signals in the configuration shown in FIG. 10.

FIG. 12 shows a configuration in which the wavelengths of output optical signals from the former-stage regenerator are the same as the wavelengths of the input optical signals in the configuration shown in FIG. 10.

In FIG. 12 the same components as in FIG. 10 are given the same reference numbers as in FIG. 10.

According to the configuration shown in FIG. 12, since the volume of coherent crosstalk generated in an optical switch unit 702 can be reduced compared with the configuration shown in FIG. 10, the error rate characteristic in the latter-stage regenerator can be improved.

When wavelength-multiplexed optical signals are inputted to a demultiplexer 700, the optical signals are demultiplexed to optical signals of wavelengths of λ1 to λn. Each signal is regenerated by a regenerator 900, and the noise and crosstalk generated in the transmission line are removed. In FIG. 12, since the wavelengths of the optical signals are not converted, the optical signals are inputted to the optical switch unit 702 as they are. Thus, since all the optical signals demultiplexed in one demultiplexer 700 differ in wavelength, in FIG. 12 the number of optical signals of the same wavelength is the same as the number of demultiplexers. Accordingly, the number of optical signals of the same wavelength among optical signals inputted to the optical switch unit 702 is reduced compared with the configurations of FIGS. 10 and 11, and thereby the influence of the coherent crosstalk can be reduced. That is, since the S/N ratio degradation generated in the optical switch unit 702 is suppressed, the error rate characteristic in the regenerator 901 can be improved.

When optical signals are outputted from the optical switch unit 702, the optical signals are regenerated by a regenerator 901, and the wavelengths are converted. As described earlier, the wavelength conversion by the regenerator 901 is performed so that all the optical signals inputted to one multiplexer 704 differ in wavelength. In FIG. 12 the converted 36 wavelengths are λ1 to λn. Then, the optical signals are wavelength-multiplexed by the multiplexer 704, and are outputted to the transmission line.

Although in the configuration shown in FIG. 12 there is no wavelength conversion in a regenerator 900, the regenerator can also be configured as to convert the wavelengths of optical signals. That is, optical signals with a high possibility of the optical path crossing in the optical switch unit 702 can also be detected by a controller circuit (not shown in the diagram) of the optical switch unit 702 beforehand, and the wavelength conversion function of the regenerator 900 can also be controlled so that the optical signals differ in wavelength. Alternatively, all the optical signals from the regenerator 900 can be made to differ in wavelength. Thus, since all the optical signals inputted to the optical switch unit 702 can be made to differ in wavelength, the occurrence of coherent crosstalk in the optical switch unit 702 can be further suppressed.

Figure 13:
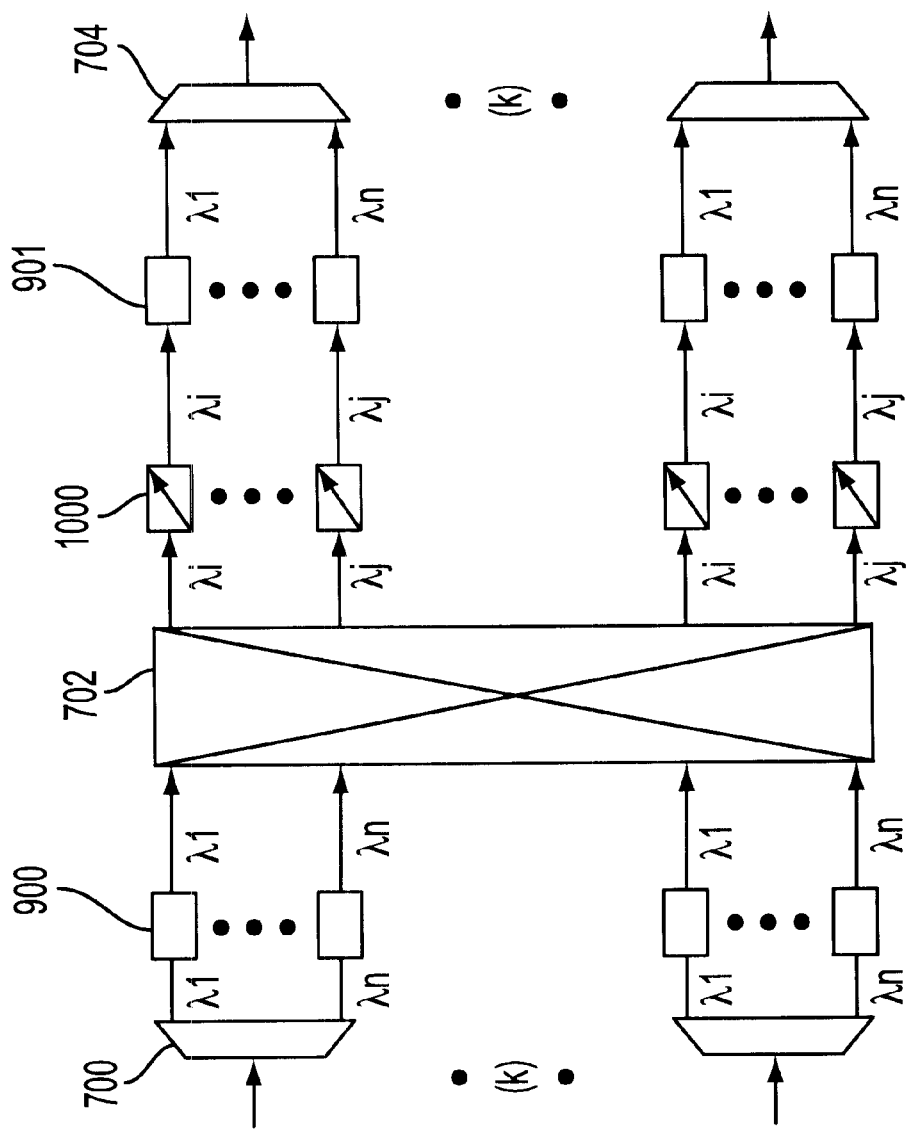
FIG. 13 shows a configuration in which a noise elimination filter capable of changing transmission wavelength is provided before the latter-stage regenerator in the configuration shown in FIG. 12.

FIG. 13 shows the configuration in which a noise elimination filter capable of changing a transmission wavelength is provided before the latter-stage regenerator in the configuration shown in FIG. 12.

In FIG. 13 the same components as in FIG. 12 are given the same reference numbers as in FIG. 12.

In FIG. 13, in a former-stage regenerator 900, the wavelengths of the output optical signals are the same as the wavelengths of the input optical signals. For this reason, the error rate characteristic in a latter-stage regenerator 901 can be improved as described with reference to FIG. 12. The error rate characteristic in the latter-stage regenerator 901 can be further improved by providing a noise elimination filter 1000.

When wavelength-multiplexed optical signals are inputted to a demultiplexer 700, the optical signals are demultiplexed to optical signals of wavelengths $\lambda 1$ to $\lambda n$, and are inputted to regenerators 900 provided for each of the wavelength of $\lambda 1$ to $\lambda n$. The regenerators 900 regenerate the optical signals, improve the S/N ratio, and input the optical signals to an optical switch unit 702 without converting the wavelengths. The inputted optical signals are routed and are outputted from each output port of the optical switch unit 702. Then, each optical signal is inputted to a noise elimination filter 1000 provided for each output port. Since the noise elimination filter 1000 passes only main signals of inputted optical signals of each wavelength, the noise and crosstalk generated by the optical amplifiers in the optical switch unit 702 can be removed. In this way, optical signals with an improved S/N ratio are regenerated and inputted to a regenerator 901, the wavelengths are converted, and the optical signals are wavelength-multiplexed in a multiplexer 704 and transmitted to the transmission line.

Like the configuration as described with reference to FIG. 8, the noise elimination filter 1000 is designed so that the transmission band may be changed according to the wavelengths of optical signals inputted from the optical switch unit 702. The configuration for this purpose is like the configuration described with reference to FIG. 8. That is, a controller circuit (not shown in the diagram) obtains information on routing from the operating system of an optical network, controls the optical paths in the optical switch unit 702, estimates the wavelengths of the optical signals outputted from each port, and properly adjusts the transmission band of the noise elimination filter 1000. As described earlier, for example, an acousto-optic filter, fiber Fabry-Perot filter, etc. are used for the noise elimination filter 1000.

As described with reference to FIG. 12, a regenerator 900 can also be provided with a wavelength conversion function, and can convert the wavelength of each optical signal to an optimal wavelength, if necessary.

Figure 14:
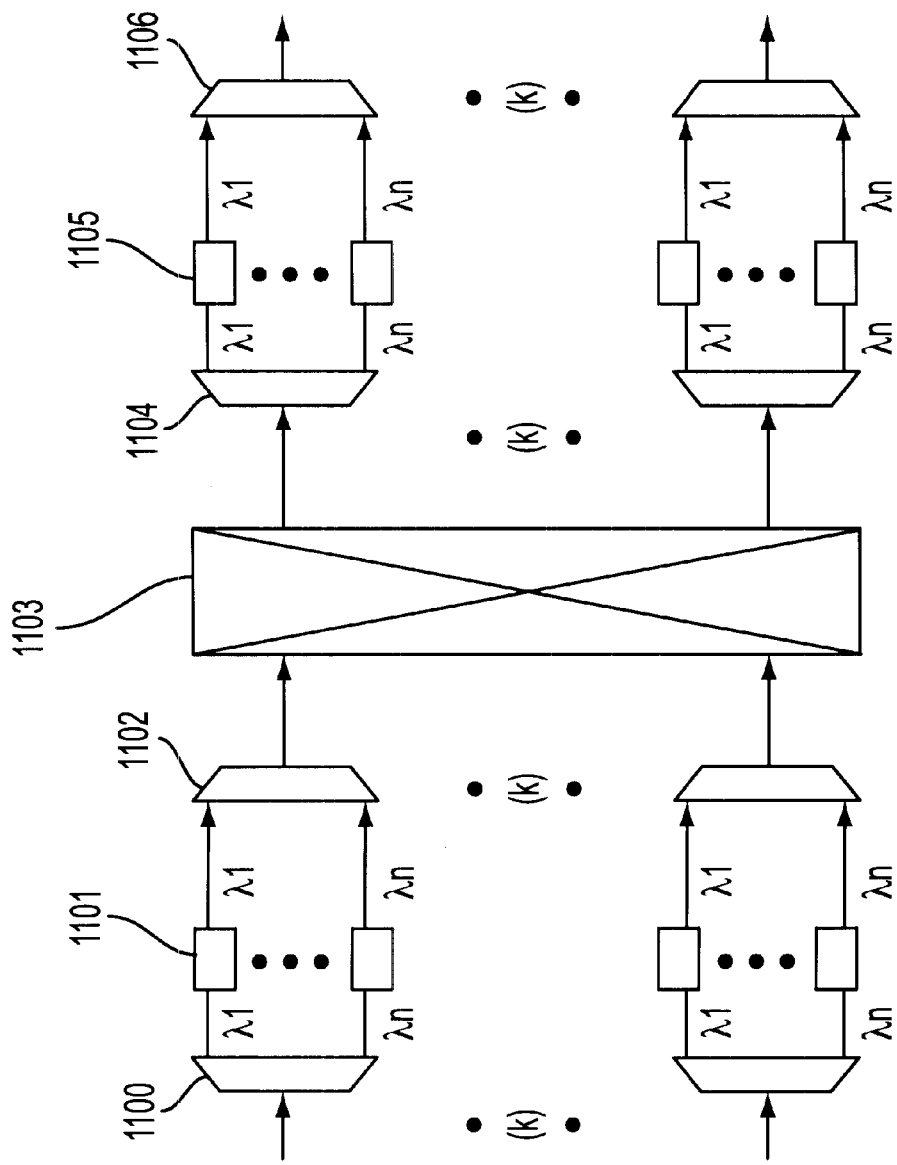
FIG. 14 shows a configuration of the fixed wavelength type wavelength-multiplexed optical XC using a wavelength selector unit.

FIG. 14 shows a configuration of the fixed wavelength type wavelength-multiplexed optical XC using a wavelength selector unit.

This is a configuration in which each node input part is provided with a demultiplexer 1100, the same number of regenerators 1101 as the number of the wavelengths and a multiplexer 1102. In the regenerators 1101 the wavelengths of output optical signals are the same as the wavelengths of the input optical signals. According to this configuration, in the former-stage regenerator 1101, optical signals can be regenerated by compensating for only the degradation due to the noise and crosstalk generated in the transmission line. In the latter-stage regenerator 1105, optical signals can be regenerated by compensating for only the degradation due to the noise and crosstalk generated in the wavelength-multiplexed optical XC.

When wavelength-multiplexed optical signals are inputted to the demultiplexer 1100, the optical signals are demultiplexed to optical signals of each wavelength, and are inputted to a regenerator 1101. The S/N ratio degradation of optical signals generated in the transmission line is removed by the above-mentioned function when the optical signals are regenerated by the regenerator 1101. The regenerator 1101 does not convert the wavelengths, and inputs each regenerated optical signal to a multiplexer 1102. In the multiplexer 1102 optical signal demultiplexed by the demultiplexer are wavelength-multiplexed again and are inputted to a wavelength selector unit 1103. The wavelength selector unit 1103 routes the wavelength-multiplexed optical signals as they are, and outputs the optical signals from output ports. The outputted optical signals are inputted to the multiplexers 1104 provided for each output port of the wavelength selector unit 1103, and are demultiplexed to optical signals of each wavelength. The optical signals of each wavelength are regenerated by a regenerator 1105 provided for each wavelength. When optical signals are regenerated, the S/N ratio degradation generated in the wavelength selector unit 1103 of each optical signal is compensated for, and the optical signals are inputted to a multiplexer 1106. The multiplexer 1106 wavelength-multiplexes the optical signals of each wavelength, and the multiplexed optical signals are transmitted to the transmission line.

In this way, since both degradations of the S/N ratio due to the propagation in the transmission line and that generated by optical amplifiers, etc. provided in the wavelength selector unit 1103, can be compensated for by providing the regenerators 1101 and 1105, respectively, on the input and output sides of the wavelength selector unit 1103, the error rate characteristic of optical signals can be improved.

Figure 15A:
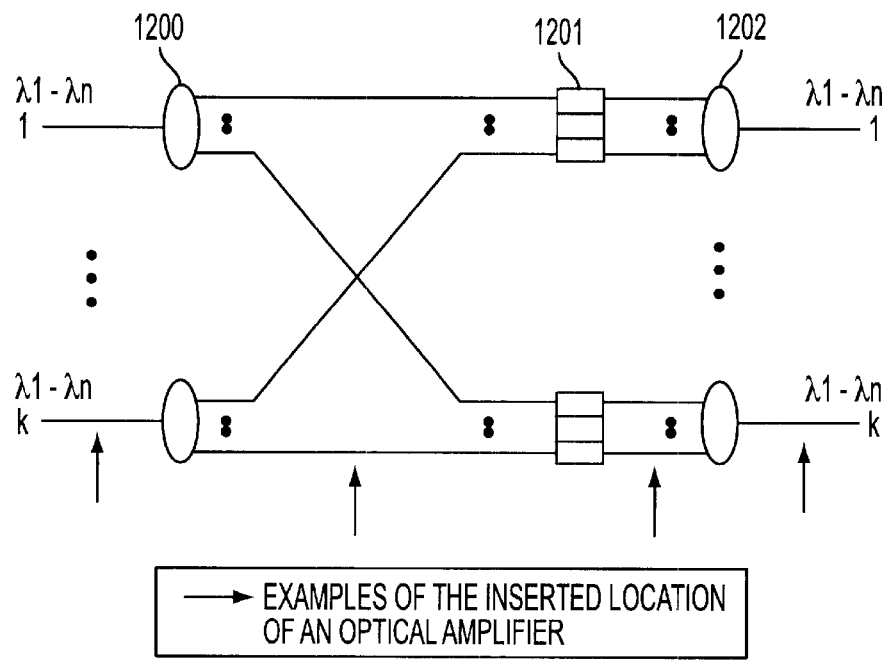
FIGS. 15A and 15B show configurations of the wavelength selector unit.
Figure 15B:
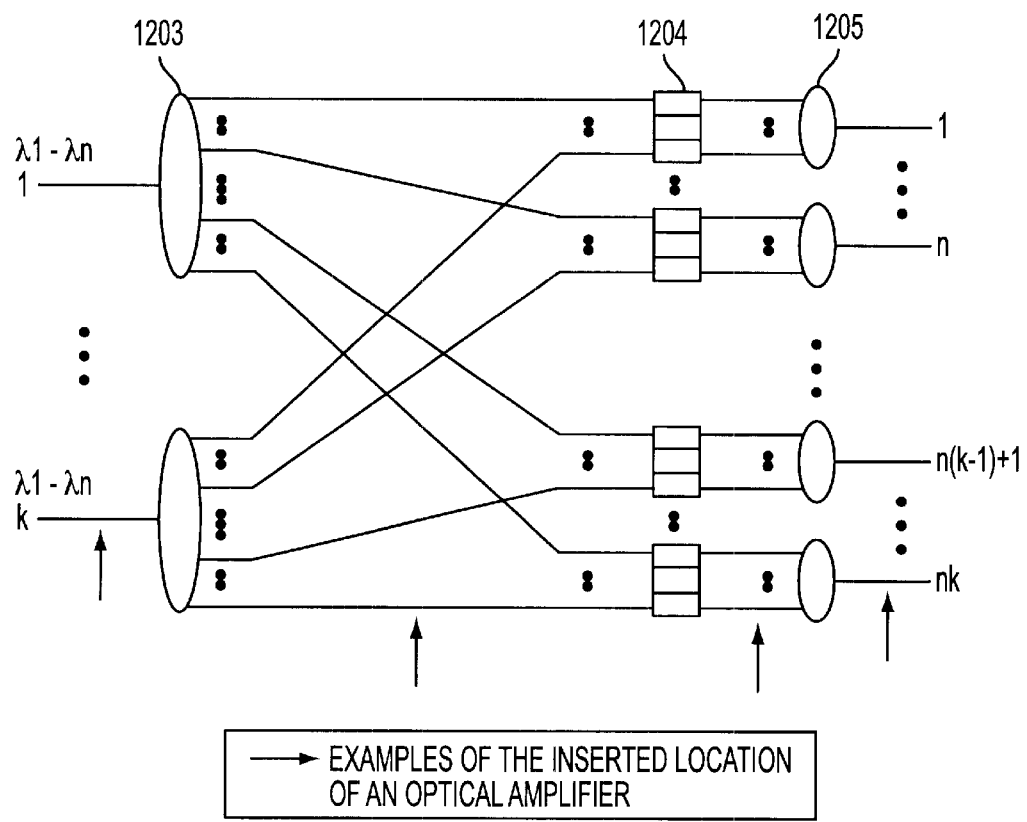

FIGS. 15A and 15B show configurations of a wavelength selector unit.

FIG. 15A shows a general configuration of a fixed wavelength type wavelength selector unit, wherein a multi-wavelength filter 1201 is a filter for selecting a plurality of desired wavelengths out of wavelength-multiplexed input optical signals. For this example, an acousto-optic filter can be considered. In this configuration, loss increases as the number of ports increases. Accordingly, an optical amplifier has to be inserted. In FIG. 15A examples of the inserted locations of the optical amplifier are indicated by the arrow marks.

When wavelength-multiplexed optical signals are inputted to an optical coupler 1200, the optical signals are distributed to a plurality of optical signals of each output port. The distributed optical signals are inputted to different multi-wavelength filters 1201. Each multi-wavelength filter 1201 extracts a specific optical signal, and outputs the optical signal. Then, the optical signals selected by each multi-wavelength filter 1201 are coupled by an optical coupler 1202, and are transmitted as wavelength-multiplexed optical signals of wavelengths of $\lambda 1$ to $\lambda n$.

FIG. 15B shows a general configuration of a converted wavelength type wavelength selector unit, wherein a wavelength filter 1204 is a filter for selecting a desired wavelength out of wavelength-multiplexed input optical signals. For this example, an acousto-optic filter can be considered. In this configuration, loss increases as the numbers of both ports and wavelengths increase. Accordingly, an optical amplifier has to be inserted. In FIG. 15B examples of the inserted locations of the optical amplifier are indicated by the arrow marks.

When wavelength-multiplexed optical signals are inputted to an optical coupler 1203, the optical signals are distributed to a plurality of optical signals of each output port. The distributed optical signals are inputted to different wavelength filters 1204. Each wavelength filter 1204 extracts a specific optical signal. The same number of optical couplers 1205 as the product of the number of wavelengths n multiplied by the number of input ports k are provided, and optical signals of a single wavelength are outputted from each optical coupler 1205. That is, the wavelength-multiplexed optical signals are routed, by passing through a wavelength selector unit shown in FIG. 15B, for each optical signal of each wavelength inputted to each input port, and are outputted without being wavelength-multiplexed.

For details of such a wavelength selector unit as shown in FIG. 15B, see the Japanese Laid-open Patent Publication No. 8-019964.

Figure 16:
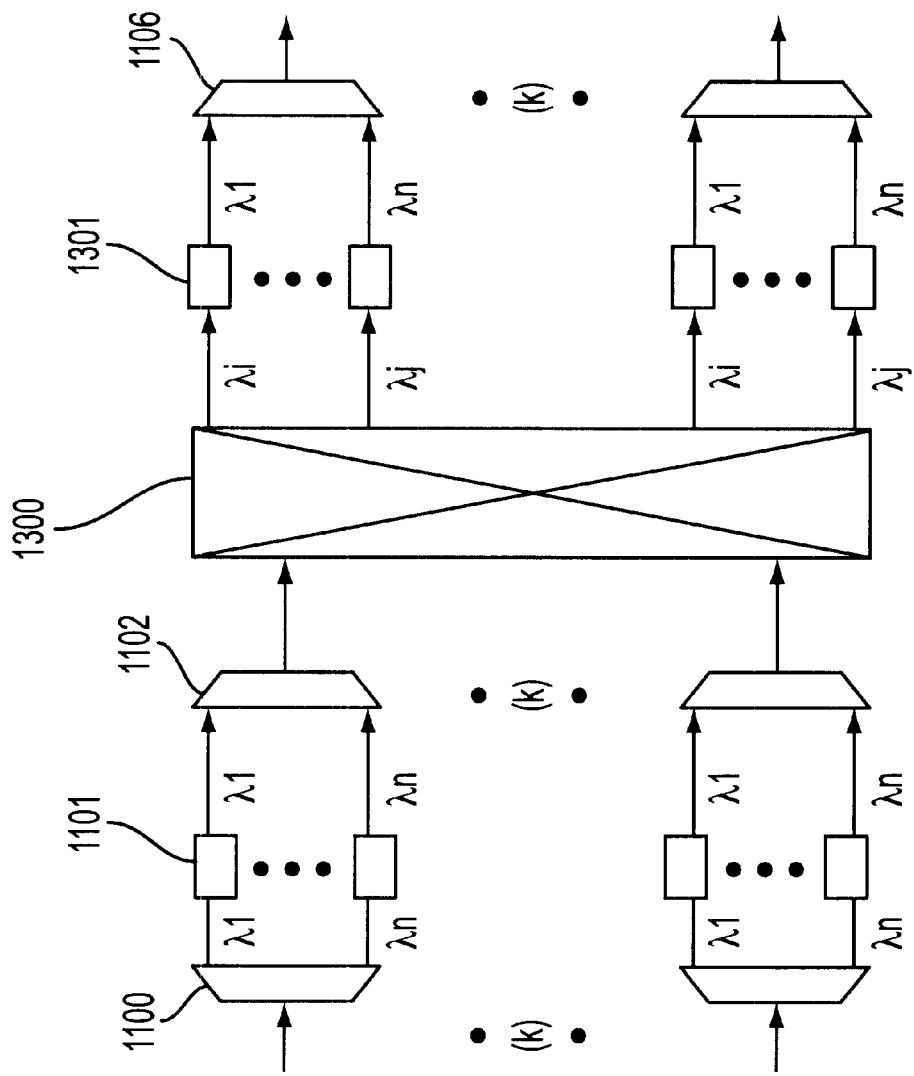
FIG. 16 shows a configuration of the converted wavelength type wavelength-multiplexed optical XC using a wavelength selector unit.

FIG. 16 shows a configuration of the converted wavelength type wavelength-multiplexed optical XC using a wavelength selector unit.

In FIG. 16 the same components as in FIG. 14 are given the same reference numbers as in FIG. 14.

This is a configuration in which each node input port is provided with a demultiplexer 1100, the same number of regenerators 1101 as the number of the wavelengths, and a multiplexer 1102. In the regenerators 1101 the wavelengths of the output optical signals are the same as the wavelengths of the input optical signals. According to this configuration, in the former-stage regenerator 1101, optical signals can be regenerated by compensating for only the degradation due to the noise and crosstalk generated in the transmission line. In the latter-stage regenerator 1301, optical signals can be regenerated by compensating for only the degradation due to the noise and crosstalk generated in the wavelength selector unit 1300.

When wavelength-multiplexed optical signals are inputted to a demultiplexer 1100, the optical signals are demultiplexed to optical signals of each wavelength by the demultiplexer 1100, and are inputted to regenerators 1101 provided for each wavelength. When the optical signals are regenerated by the regenerators 1101, the S/N ratio degradation generated in the transmission line can be compensated for.

When the optical signals are outputted from the regenerators 1101, the optical signals are inputted to a multiplexer 1102, are multiplexed to wavelength-multiplexed optical signals consisting of the same optical signals as the input signal, and are inputted to the wavelength selector unit 1300.

The wavelength selector unit 1300 has the configuration as shown in FIG. 15B, and after routing the optical signals, it outputs demultiplexed optical signals of each wavelength from the output ports. The optical signals outputted from each output port are inputted to regenerators 1301 provided corresponding to each output port, and are regenerated. Thus, the S/N ratio degradation generated in the wavelength selector unit 1300 can be compensated for. When the optical signals are outputted from the regenerators 1301, the wavelengths of the optical signals are converted to appropriate wavelengths in order to be wavelength-multiplexed, and are inputted to a multiplexer 1106. The multiplexer 1106 multiplexes the inputted optical signals and transmits the multiplexed optical signals to the transmission line.

In the configuration shown in FIG. 16, since the wavelengths of optical signals each having a specific wavelength when being inputted are converted by the regenerators 1301, generally speaking the input and output wavelengths of the optical signals of the wavelength optical XC are different.

Figure 17:
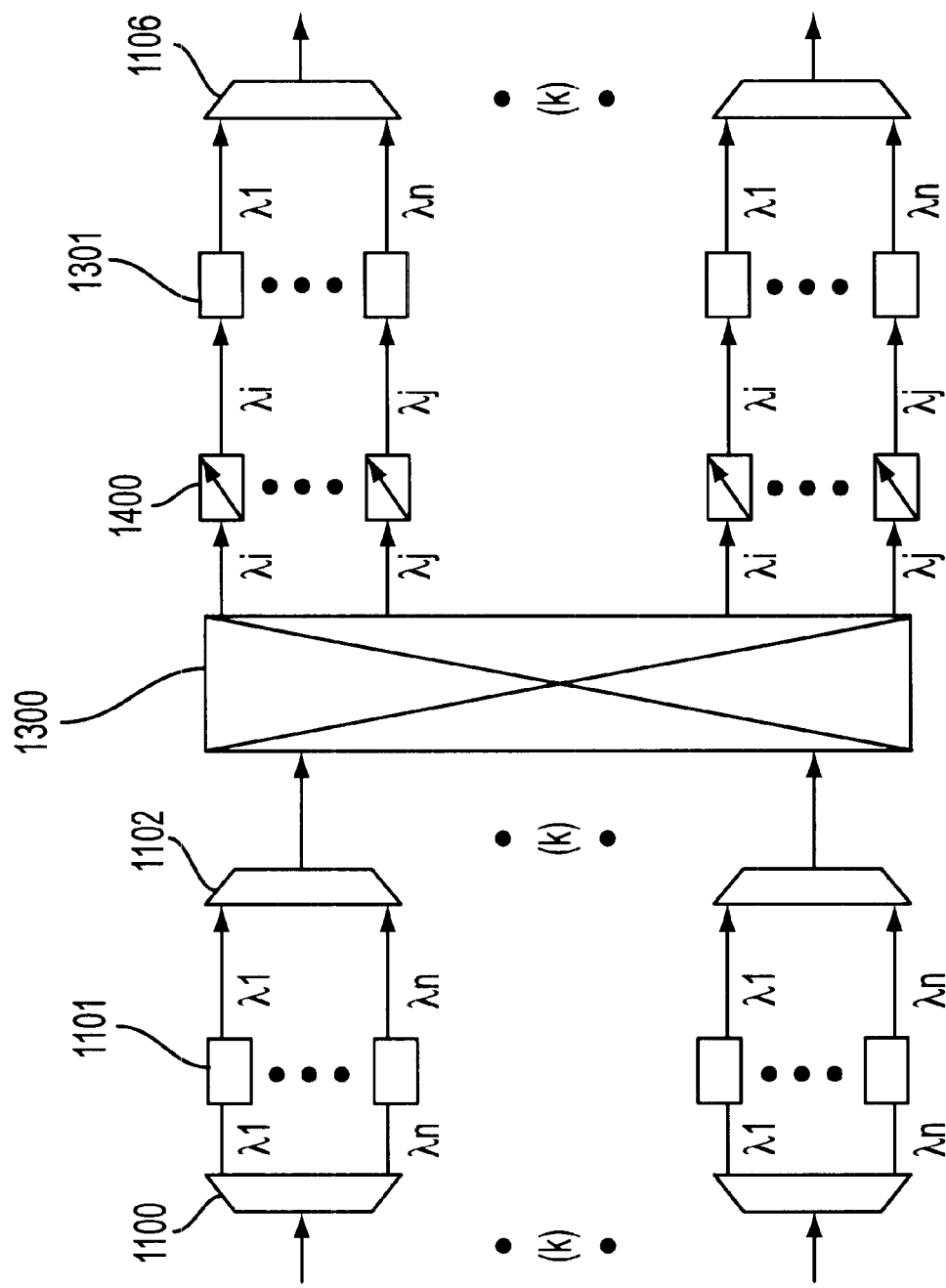
FIG. 17 shows a configuration in which a noise elimination filter capable of changing transmission wavelength is provided before the latter-stage regenerator in the configuration shown in FIG. 16.

FIG. 17 shows the configuration in which a noise elimination filter capable of changing a transmission wavelength is provided before the latter-stage regenerator in the configuration shown in FIG. 16.

In FIG. 17 the same components as in FIG. 16 are given the same reference numbers as in FIG. 16.

The object of a noise elimination filter 1400 is to eliminate noise generated in a wavelength selector unit 1300 when optical amplifiers are provided in the wavelength selector unit 1300 (However, some noise remains in the neighborhood of the wavelengths of optical signals). Thus, the error rate characteristic of the latter-stage regenerator 1301 can be improved.

In FIG. 17, in the same way as described in FIG. 16, when wavelength-multiplexed optical signals are inputted to a demultiplexer 1100, the optical signals are demultiplexed to optical signals of each wavelength, and are regenerated by a regenerator 1101. Thus, the S/N ratio degradation generated in the transmission line is compensated for. Then, the optical signals of each wavelength are multiplexed to wavelength-multiplexed optical signals again by a multiplexer 1102, and are inputted to the wavelength selector unit 1300. The wavelength selector unit 1300 routes the optical signals, and outputs the optical signals from the output ports for each wavelength of the optical signals. The outputted optical signals of each wavelength are inputted to the noise elimination filter 1400, and the noise, etc. degrading the S/N ratio of the main signals is eliminated.

When the optical signals have passed through the noise elimination filter 1400, the optical signals are regenerated by the regenerators 1301, the wavelengths are converted, and the optical signals are inputted to a multiplexer 1106. The wavelength conversion is performed so that all the optical signals inputted to one multiplexer differ in wavelength and each wavelength may conform to the standards of an optical network, when the optical signals are wavelength-multiplexed by the multiplexer 1106.

Since the optical signals inputted to the noise elimination filter 1400 differ in wavelength depending on the routing status in the wavelength selector unit 1300, as described with reference to FIG. 8, a controller circuit (not shown in the diagram) for controlling the routing of the wavelength selector unit 1300 checks based on routing information (pass setting signal) provided by the operating system, as to which wavelength is to be outputted from which output port, and controls so as to appropriately change the transmission band of the noise elimination filter, when establishing a call.

For concrete examples of the noise eliminating filters an acousto-optic filter, fiber Fabry-Perot filter, etc. can be considered.

In the configuration shown in FIG. 17, since the S/N ratio of optical signals can be improved by providing a regenerator at the former- and latter-stages of the wavelength selection unit, and further providing a noise elimination filter, the error rate characteristic can be improved when the latter-stage regenerator regenerates the optical signals.

As described above, optical signals in the former- and latter-stage regenerators can be regenerated by compensating for the noise and crosstalk generated in the transmission line, and the optical switch unit and the wavelength selection unit, respectively, by providing a regenerator after demultiplexing the wavelength on the input side (at the former-stage) and a noise elimination filter before the regenerator on the output side (at the latter-stage), and thereby the error rate characteristic of the entire network can be improved. Accordingly, the present invention greatly contributes to the functional improvement of an optical transmission system using these configurations.

What is claimed is:

1. An optical exchanger for accommodating a plurality of wavelength-multiplexed input/output optical links, routing wavelength-multiplexed optical signals inputted from each input link, and outputting the optical signals to output links, comprising:

first demultiplexing means for demultiplexing wavelength-multiplexed optical signals inputted from the input link to optical signals of each wavelength;

first regenerating means for regenerating optical signals of each wavelength outputted from the demultiplexing means;

first multiplexing means for wavelength-multiplexing optical signals of each wavelength outputted from the first regenerating means;

wavelength selecting means, consisting of one or more optical couplers and a multi-wavelength selection filter, for routing wavelength-multiplexed optical signals outputted from the multiplexing means;

second demultiplexing means for demultiplexing optical signals outputted from the wavelength selecting means to optical signals of each wavelength;

second regenerating means for regenerating optical signals outputted from the second demultiplexing means and compensating for an S/N ratio degradation; and second multiplexing means for wavelength-multiplexing optical signals of each wavelength outputted from the second regenerating means.

2. An optical exchanger for accommodating a plurality of wavelength-multiplexed input/output optical links, routing wavelength-multiplexed optical signals inputted from each input link, and outputting the optical signals to output links, comprising:

demultiplexing means for demultiplexing wavelength-multiplexed optical signals inputted from the input link to optical signals of each wavelength;

first regenerating means for regenerating optical signals of each wavelength outputted from the demultiplexing means and compensating for an S/N ratio degradation generated in the transmission line;

first multiplexing means for wavelength-multiplexing optical signals outputted from the first regenerating means;

wavelength selecting means, consisting of two couplers and a wavelength selection filter, for routing wavelength-multiplexed optical signals inputted from the first multiplexing means and outputting the optical signals of each wavelength;

second regenerating means for regenerating optical signals of each wavelength outputted from the wavelength selecting means and compensating for an S/N ratio degradation; and second multiplexing means for wavelength-multiplexing optical signals of each wavelength outputted from the second regenerating means.

3. The optical exchanger according to claim 2, further comprising:

noise elimination filter means for enabling changing of the transmission band thereof, provided at the former stage of said second regenerating means and on the output side of said wavelength selecting means.

4. An optical exchanger for accommodating a plurality of wavelength-multiplexed input/output optical links, routing wavelength-multiplexed optical signals inputted from each input link, and outputting the optical signals to output links, comprising:

a first demultiplexer demultiplexing wavelength-multiplexed optical signals inputted from the input link to optical signals of each wavelength;

a first regenerator regenerating optical signals of each wavelength outputted from the first demultiplexer;

a first multiplexer wavelength multiplexing optical signals of each wavelength outputted from the first regenerator;

a wavelength selector including one or more optical couplers and a multi-wavelength selection filter for routing wavelength-multiplexed optical signals outputted from the first multiplexer;

a second demultiplexer demultiplexing optical signals outputted from the wavelength selector to optical signals of each wavelength;

a second regenerator regenerating optical signals outputted from the second demultiplexer and compensating for an S/N ratio degradation; and a second multiplexer wavelength multiplexing optical signals of each wavelength outputted from the second regenerator.

5. An apparatus comprising:

a plurality of optical links, each link transmitting a wavelength division multiplexed (WDM) light;

a plurality of first demultiplexers corresponding, respectively, to the plurality of optical links, each first demultiplexer demultiplexing the WDM light of the corresponding optical link into a plurality of optical signals;

a plurality of regenerators corresponding to each first demultiplexer, respectively, the plurality of regenerators regenerating the demultiplexed plurality of optical signals of the corresponding first demultiplexer;

a plurality of first multiplexers associated with the plurality of first demultiplexers, respectively, each first multiplexer multiplexing together the plurality of regenerated optical signals of the plurality of regenerators corresponding to the first demultiplexer associated with the respective first multiplexer, to thereby output a plurality of WDM lights from the plurality of first multiplexers, respectively;

a wavelength selector including at least one optical coupler and a multi-wavelength selection filter to route the plurality of WDM lights output from the plurality of first multiplexers to a plurality of output ports, respectively;

a plurality of second demultiplexers corresponding to the plurality of output ports, respectively, each second demultiplexer demultiplexing the WDM light output from the corresponding output port into a plurality of optical signals;

a plurality of regenerators corresponding to each second demultiplexer, respectively, the plurality of regenerators regenerating the demultiplexed plurality of optical signals of the corresponding second demultiplexer;

a plurality of second multiplexers associated with the plurality of second demultiplexers, respectively, each second multiplexer multiplexing together the plurality of regenerated optical signals of the plurality of regenerators corresponding to the second demultiplexer associated with the respective second multiplexer, to thereby output a plurality of multiplexed lights from the plurality of second multiplexers, respectively; and a plurality of output links outputting the plurality of multiplexed lights, respectively.

6. An optical exchanger for accommodating a plurality of wavelength-multiplexed input/output optical links, routing wavelength-multiplexed optical signals inputted from each input link, and outputting the optical signals to output links, comprising:
- a demultiplexer demultiplexing wavelength-multiplexed optical signals inputted from a respective input link of the plurality of wavelength-multiplexed input/output optical links to optical signals of each wavelength;
- a first regenerator regenerating optical signals of each wavelength outputted from the demultiplexer and compensating for an S/N ratio degradation generated in the transmission line;
- a first multiplexing means for wavelength multiplexing optical signals outputted from the first regenerating means;
- a wavelength selector, consisting of two couplers and a wavelength selection filter, to route wavelength-multiplexed optical signals inputted from the first multiplexer and outputting the optical signals of each wavelength;
- a second regenerator regenerating optical signals of each wavelength outputted from the wavelength selector and compensating for an S/N ratio degradation; and
- a second multiplexer wavelength multiplexing optical signals of each wavelength outputted from the second regenerator.

7. The optical exchanger according to claim 6, further comprising:
- a noise elimination filter enabling changing of the transmission band thereof, provided at the former stage of said second regenerator and on the output side of said wavelength selector.

8. An apparatus comprising:
- a plurality of optical links, each link transmitting a wavelength division multiplexed (WDM) light;
- a plurality of first demultiplexers corresponding, respectively, to the plurality of optical links, each first demultiplexer demultiplexing the WDM light of the corresponding optical link into a plurality of optical signals;
- a plurality of regenerators corresponding to each first demultiplexer, respectively, the plurality of regenerators regenerating the demultiplexed plurality of optical signals of the corresponding first demultiplexer;
- a plurality of first multiplexers associated with the plurality of first demultiplexers, respectively, each first multiplexer multiplexing together the plurality of regenerated optical signals of the plurality of regenerators corresponding to the first demultiplexer associated with the respective first multiplexer, to thereby output a plurality of WDM lights from the plurality of first multiplexers, respectively;
- a wavelength selecting means including at least one optical coupler and a multiwavelength selection filter to route the plurality of WDM lights output from the plurality of first multiplexers to a plurality of output ports, respectively;
- a plurality of second demultiplexers corresponding to the plurality of output ports, respectively, each second demultiplexer demultiplexing the WDM light output from the corresponding output port into a plurality of optical signals;
- a plurality of regenerators corresponding to each second demultiplexer, respectively, the plurality of regenerators regenerating the demultiplexed plurality of optical signals of the corresponding second demultiplexer;
- a plurality of second multiplexers associated with the plurality of second demultiplexers, respectively, each second multiplexer multiplexing together the plurality of regenerated optical signals of the plurality of regenerators corresponding to the second demultiplexer associated with the respective second multiplexer, to thereby output a plurality of multiplexed lights from the plurality of second multiplexers, respectively; and
- a plurality of output links outputting the plurality of multiplexed lights, respectively.

* * * * *